United States Patent
Zhou et al.

(10) Patent No.: US 11,901,937 B2
(45) Date of Patent: Feb. 13, 2024

(54) LONG-DISTANCE OPTICAL FIBER DETECTING METHOD, APPARATUS, DEVICE AND SYSTEM, AND STORAGE MEDIUM

(71) Applicant: ACCELINK TECHNOLOGIES CO., LTD., Wuhan (CN)

(72) Inventors: Qi Zhou, Wuhan (CN); Tao Xiong, Wuhan (CN); Chunping Yu, Wuhan (CN); Qinlian Bu, Wuhan (CN)

(73) Assignee: ACCELINK TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 17/907,248

(22) PCT Filed: Dec. 28, 2020

(86) PCT No.: PCT/CN2020/140401
§ 371 (c)(1),
(2) Date: Sep. 23, 2022

(87) PCT Pub. No.: WO2021/203751
PCT Pub. Date: Oct. 14, 2021

(65) Prior Publication Data
US 2023/0106273 A1 Apr. 6, 2023

(30) Foreign Application Priority Data
Apr. 10, 2020 (CN) .......................... 202010277902.5

(51) Int. Cl.
*H04B 10/071* (2013.01)
*G01M 11/00* (2006.01)

(52) U.S. Cl.
CPC ....... *H04B 10/071* (2013.01); *G01M 11/3145* (2013.01); *G01M 11/39* (2013.01)

(58) Field of Classification Search
CPC ............ G01M 11/31; G01M 11/3109; G01M 11/3118; G01M 11/3127; G01M 11/3136;
(Continued)

(56) References Cited

U.S. PATENT DOCUMENTS 5,903,375 A    5/1999  Horiuchi et al.
10,277,311 B2* 4/2019  Archambault ..... H04B 10/0775
(Continued)

FOREIGN PATENT DOCUMENTS

CN    101447832 A    6/2009
CN    102142891 A    8/2011
(Continued)

OTHER PUBLICATIONS

International Search Report issued in International Application No. PCT/CN2020/140401, dated Mar. 17, 2021.
(Continued)

*Primary Examiner* — Gordon J Stock, Jr.
(74) *Attorney, Agent, or Firm* — Knobbe, Martens, Olson & Bear, LLP

(57) ABSTRACT

Disclosed are a long-distance optical fiber detecting method, apparatus, device and system, and a storage medium. The method comprises: in response to a detection request of a target node on a to-be-detected optical fiber, determining a first and second sampling sequence that are formed by respectively propagating, on said optical fiber, a first and second optical signal respectively sent from each end of the optical fiber through an OTDR; determining a total length of the optical fiber; generating a detection result according to the first and second sampling sequence and the total length, and sending the detection result to the target node. By determining the first and second sampling sequence and combining the total length of the optical fiber, a detection result of the to-be-detected optical fiber is generated.

13 Claims, 10 Drawing Sheets

(58) Field of Classification Search
CPC ......... G01M 11/3145; G01M 11/3154; G01M 11/3163; G01M 11/3172; G01M 11/3181; G01M 11/319; G01M 11/33; G01M 11/335; G01M 11/336; G01M 11/337; G01M 11/338; G01M 11/39; H04B 10/071
See application file for complete search history.

(56) References Cited

U.S. PATENT DOCUMENTS

| | | | | |
|---|---|---|---|---|
| 10,313,006 | B2 * | 6/2019 | Prescott | H04B 10/0799 |
| 10,547,378 | B2 * | 1/2020 | Chang | H04B 10/25 |
| 11,201,667 | B2 * | 12/2021 | Archambault | G01M 11/3127 |
| 11,408,801 | B2 * | 8/2022 | Roux | G01M 11/3145 |
| 2014/0090474 | A1 | 4/2014 | Huffman | |
| 2017/0199026 | A1 | 7/2017 | Yin et al. | |
| 2018/0123687 | A1 | 5/2018 | Chang et al. | |
| 2018/0266808 | A1 | 9/2018 | Shaar et al. | |
| 2023/0152183 | A1 * | 5/2023 | Cahill | H04B 10/071 356/73.1 |

FOREIGN PATENT DOCUMENTS

| | | | | |
|---|---|---|---|---|
| CN | 104866708 | A | | 8/2015 |
| CN | 105490734 | A | | 4/2016 |
| CN | 108306674 | A | | 7/2018 |
| CN | 108627317 | A | | 10/2018 |
| CN | 110474676 | A | | 11/2019 |
| CN | 110635840 | A | | 12/2019 |
| CN | 111490818 | A | | 8/2020 |
| CN | 111595241 | A * | 8/2020 | ............. G01B 11/02 |
| KR | 20030097258 | A | | 12/2003 |
| WO | WO-2020168833 | A1 * | 8/2020 | ............. G01B 11/02 |

OTHER PUBLICATIONS

Search Report issued in Chinese Application No. 2020012779025, dated Dec. 9, 2020.

Search Report issued in Chinese Application No. 2020012779025, dated Dec. 9, 2021.

* cited by examiner

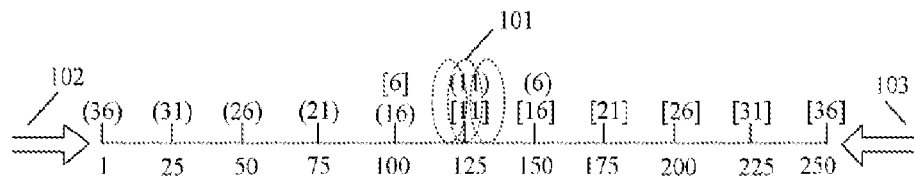

FIG. 1

| 202 |
|---|
| In response to a detection request of a target node on a to-be-detected optical fiber, determine a first sampling sequence and a second sampling sequence that are formed by respectively propagating, on the to-be-detected optical fiber, a first optical signal and a second optical signal respectively sent from each end of the to-be-detected optical fiber through an OTDR |

| 204 |
|---|
| Determine the total length of the to-be-detected optical fiber |

| 206 |
|---|
| Generate a detection result according to the first sampling sequence, the second sampling sequence and the total length |

| 208 |
|---|
| Send the detection result to the target node |

FIG. 2

LONG-DISTANCE OPTICAL FIBER DETECTING METHOD, APPARATUS, DEVICE AND SYSTEM, AND STORAGE MEDIUM

CROSS-REFERENCE TO RELATED APPLICATION(S)

The present disclosure claims the priority of a Chinese patent application No. 202010277902.5 filed on Apr. 10, 2020, the disclosure of which is hereby incorporated by reference herein in its entirety.

TECHNICAL FIELD OF THE DISCLOSURE

Embodiments of the present disclosure relate to computer technology, and in particular, to a long-distance optical fiber detecting method, apparatus, device and system, and a storage medium.

BACKGROUND

In a case of construction and maintenance of optical cable lines, an optical time-domain reflectometer (OTDR) is usually used to test characteristics of optical fibers in an optical cable. The OTDR is also an important apparatus of an on-line monitoring system in an optical communication network, and a dynamic range is one of the important technical indexes of the OTDR. The larger the dynamic range of the OTDR, the longer the distance of the optical communication line that can be monitored. However, the dynamic range of the OTDR may not be able to meet the detection requirements of long-distance optical fiber lines, and for lines exceeding a certain length, the OTDR will not be able to detect the information about distal optical fibers.

SUMMARY

The embodiments of the present disclosure provide a long-distance optical fiber detecting method, apparatus, device and system, and a storage medium.

An embodiment of the present disclosure provide a long-distance optical fiber detecting method. The method comprises: in response to a detection request of a target node on a to-be-detected optical fiber, determining a first sampling sequence and a second sampling sequence that are formed by respectively propagating, on the to-be-detected optical fiber, a first optical signal and a second optical signal respectively sent from each end of the to-be-detected optical fiber through an OTDR; determining a total length of the to-be-detected optical fiber; and generating a detection result according to the first sampling sequence, the second sampling sequence and the total length.

In this way, by means of determining the first sampling sequence and the second sampling sequence that are formed by respectively propagating, on the to-be-detected optical fiber, the first optical signal and the second optical signal respectively sent from each end of the to-be-detected optical fiber through the OTDR, and combining with the total length of the to-be-detected optical fiber, the detection result of the to-be-detected optical fiber is generated. Therefore, in a case where the optical fiber is long, full coverage detection of the entire to-be-detected optical fiber can be realized, thereby improving the reliability of optical fiber detection.

In an embodiment, the determining a total length of the to-be-detected optical fiber comprises: determining a sending time of a third optical signal recorded by a sending node, the third optical signal being used for measuring the to-be-detected optical; determining a receiving time of the third optical signal recorded by a receiving node; determining a propagation duration of the third optical signal on the to-be-detected optical fiber according to the sending time and the receiving time; and determining the total length of the to-be-detected optical fiber according to the propagation duration.

In this way, by recording the sending time and the receiving time of the third optical signal, the propagation duration of the third optical signal is determined, and the total length of the optical fiber to be detected is determined according to the propagation duration, so that the total length of the optical fiber to be detected can be determined more conveniently and accurately.

In an embodiment, the determining a sending time of a third optical signal recorded by a sending node comprises: sending, by a local end node used as the sending node, the third optical signal to an opposite end node as the receiving node, and recording a time stamp of sending the third optical signal as the sending time; correspondingly, the determining a receiving time of the third optical signal recorded by a receiving node comprises: receiving, by the local end node, the receiving time sent by the opposite end node used as the receiving node.

In this way, the sending node of the third optical signal records the sending time, and receives the receiving time sent by the receiving node, so that the sending time and the receiving time of the third optical signal can be recorded more accurately.

In an embodiment, the determining a sending time of a third optical signal recorded by a sending node comprises: receiving, by a local end node, the sending time sent by an opposite end node; correspondingly, the determining a receiving time of the third optical signal recorded by a receiving node comprises: receiving, by the local end node used as the receiving node, the third optical signal, and recording a time stamp of receiving the third optical signal as the receiving time.

In this way, the receiving node of the third optical signal records the receiving time, and receives the sending time sent by the sending node. Therefore, not only the sending time and the receiving time of the third optical signal can be recorded through the sending node, but also the receiving time and the sending time of the third optical signal can be recorded by the receiving node, thereby improving the diversity of the determination of the sending time and the receiving time of the third optical signal.

In an embodiment, the first sampling sequence is a sequence composed of corresponding optical power relative values of the first optical signal recorded at each sampling point of the to-be-detected optical fiber; and the second sampling sequence is a sequence composed of corresponding optical power relative values of the second optical signal recorded at each sampling point of the to-be-detected optical fiber.

In an embodiment, the first sampling sequence is obtained by sampling a first optical signal sent from the sending node, and the second sampling sequence is obtained by sampling a second optical signal sent from the receiving node, wherein sampling points in the first sampling sequence and the second sampling sequence are numbered from the sending node to the receiving node in an increasing sequence, respectively; correspondingly, the generating a detection result according to the first sampling sequence, the second sampling sequence and the total length comprises: determining a ratio between ½ of the total length and a distance between two adjacent sampling points; in a case where a serial number of a sampling point in the first sampling sequence is less than the ratio, adding the sampling point to a first sampling subsequence of the first sampling sequence; analyzing the first sampling subsequence, so as to obtain a first detection sub-result; in a case where a serial number of a sampling point in the second sampling sequence is larger than or equal to the ratio, adding the sampling point to a second sampling subsequence of the second sampling sequence; analyzing the second sampling subsequence, so as to obtain a second detection sub-result; generating the detection result according to the first detection sub-result and the second detection sub-result.

In this way, the detection sub-results are obtained by respectively intercepting the effective subsequences of the first sampling subsequence and the second sampling subsequence and respectively analyzing the intercepted effective subsequences of the first and second sampling subsequence, and the detection result is generated according to the two detection sub-results. Therefore, the generated detection result can be made more accurate.

In an embodiment, the generating a detection result according to the first detection sub-result and the second detection sub-result comprises: determining an adjacent optical power attenuation value of the first optical signal or the second optical signal between the adjacent sampling points; determining a third detection sub-result according to the second detection sub-result and the adjacent optical power attenuation value; and generating the detection result according to the first detection sub-result and the third detection sub-result.

In this way, the third detection sub-result is determined through the adjacent optical power attenuation value and the second detection sub-result, and the detection result is generated according to the third detection sub-result and the first detection sub-result, so that the detection result can be reflected more intuitively.

In an embodiment, after generating the detection result according to the first sampling sequence, the second sampling sequence and the total length, the method further comprises: in a case where the detection result does not meet a preset condition, determining a third sampling sequence and a fourth sampling sequence that are formed by respectively propagating, on the to-be-detected optical fiber, a fourth optical signal and a fifth optical signal sent from each end of the to-be-detected optical fiber through the OTDR; regenerating an update detection result according to the third sampling sequence, the fourth sampling sequence and the total length; and sending the update detection result to the target node.

In this way, in a case where the dynamic ranges of the first optical time-domain reflectometer and the second optical time-domain reflectometer are limited, a third optical time-domain reflectometer and a fourth optical time-domain reflectometer with larger dynamic ranges are used instead; therefore, in a case where the optical fiber is long, the coverage of the detection of the entire to-be-detected optical fiber can be improved, thereby improving the reliability of the optical fiber detection.

An embodiment of the present disclosure provides a long-distance optical fiber detecting apparatus, comprising: a response module which is configured to, in response to a detection request of a target node on a to-be-detected optical fiber, determine a first sampling sequence and a second sampling sequence formed by respectively propagating, on the to-be-detected optical fiber, a first optical signal and a second optical signal respectively sent from each end of the to-be-detected optical fiber through an OTDR; a determining module which is configured to determine a total length of the to-be-detected optical fiber; a generating module which is configured to generate a detection result according to the first sampling sequence, the second sampling sequence and the total length; and a sending module which is configured to send the detection result to the target node.

An embodiment of the present disclosure provides a long-distance optical fiber detecting device, comprising: an optical time-domain reflectometer OTDR module and a long-distance optical fiber detecting apparatus, wherein the OTDR module is configured to, in response to a detection request of a target node on a to-be-detected optical fiber, send a first optical signal and obtain a first sampling sequence formed by propagating the first optical signal on the to-be-detected optical fiber, or, send a second optical signal and obtain a second sampling sequence formed by propagating the second optical signal on the to-be-detected optical fiber; and wherein the long-distance optical fiber detecting apparatus is configured to, in response to the detection request of the target node on the to-be-detected optical fiber, trigger the OTDR module to send the first optical signal or the second optical signal, and respectively obtain the first sampling sequence and the second sampling sequence respectively formed by respectively propagating the first and second optical signals on the to-be-detected optical fiber; determine a total length of the to-be-detected optical fiber; generate a detection result according to the first sampling sequence, the second sampling sequence and the total length; and send the detection result to the target node.

An embodiment of the present disclosure provides a long-distance optical fiber detecting system, comprising: a first OTDR module, a second OTDR module, and a long-distance optical fiber detecting apparatus, wherein the first OTDR module is configured to, in response to a detection request of a target node on a to-be-detected optical fiber, send a first optical signal and obtain a first sampling sequence formed by propagating the first optical signal on the to-be-detected optical fiber; wherein the second OTDR module is configured to, in response to the detection request of the target node on the to-be-detected optical fiber, send a second optical signal and obtain a second sampling sequence formed by propagating the second optical signal on the to-be-detected optical fiber; and wherein the long-distance optical fiber detecting apparatus is configured to, in response to the detection request of the target node on the to-be-detected optical fiber, respectively trigger the first OTDR module to send the first optical signal and the second OTDR module to send the second optical signal, and respectively obtain the first sampling sequence and the second sampling sequence formed by respectively propagating the first and second optical signals on the to-be-detected optical fiber; determine a total length of the to-be-detected optical fiber; generate a detection result according to the first sampling sequence, the second sampling sequence and the total length; and send the detection result to the target node.

An embodiment of the present disclosure provides a computer readable storage medium having a computer program stored thereon, and the computer program, when executed by a processor, implements steps of the long-distance optical fiber detecting method according to any one of the embodiments of the present disclosure.

An embodiment of the present disclosure provides a computer program product, wherein the above-mentioned computer program product comprises a non-transitory computer readable storage medium storing a computer program, and the above-mentioned computer program is operable to make a computer to execute part or all of the steps as described in the long-distance optical fiber detecting methods according to the embodiments of the present disclosure. The computer program product may be a software installation package.

It should be understood that the above general description and the following detailed description are only exemplary and explanatory, and are not intended to limit the embodiments of the present disclosure.

Other features and aspects of the present disclosure will become clear on the basis of the following detailed description of exemplary embodiments with reference to the accompanying drawings.

BRIEF DESCRIPTION OF THE DRAWINGS

The accompanying drawings herein are incorporated into the present description and constitute a portion of the present description, illustrate embodiments consistent with the present disclosure, and are used together with the description to explain the principles of the present disclosure.

FIG. 1 is a schematic diagram of detecting an application scene of a long-distance optical fiber according to embodiments of the present disclosure.

FIG. 2 is a schematic flowchart of a long-distance optical fiber detecting method according to an embodiment of the present disclosure.

Figure 3A:
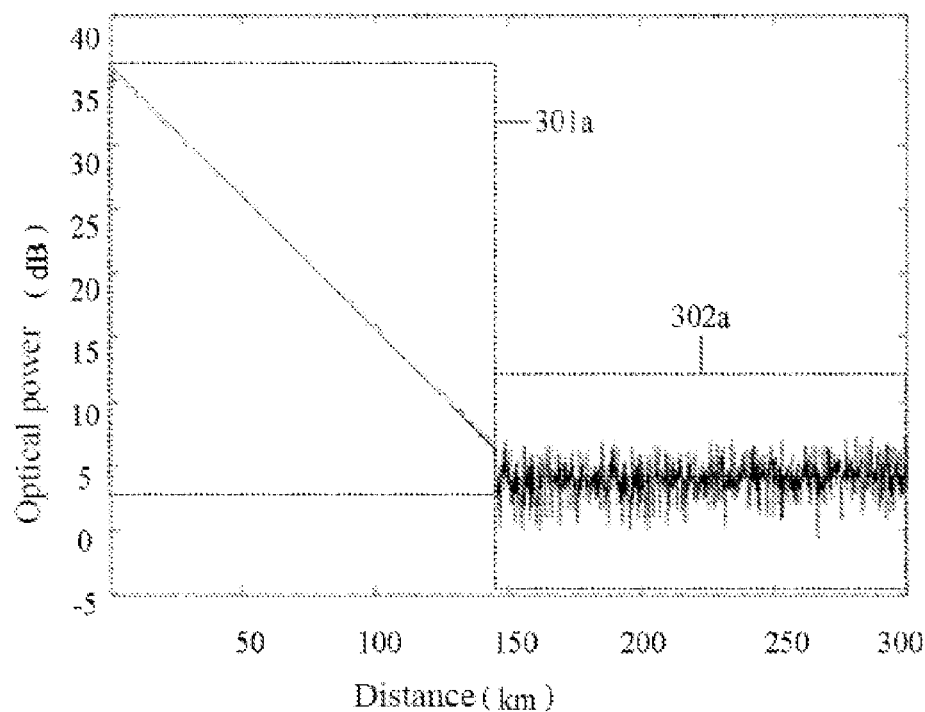
FIG. 3a is a schematic diagram of a first sampling sequence according to an embodiment of the present disclosure.

Through the above-mentioned drawings, specific embodiments of the present disclosure have been illustrated, which will be described in more detail hereinafter. These drawings and literal description are not intended to limit the scope of the concept of the present disclosure in any way, but rather to illustrate the concept of the present disclosure for those skilled in the art by referring to specific embodiments.

DETAILED DESCRIPTION

In order to make the purposes, technical solutions and advantages of the embodiments of the present disclosure clearer, the technical solutions of the embodiments of the present disclosure will be clearly and completely described below with reference to the accompanying drawings of the embodiments of the present disclosure. Obviously, the described embodiments are some, but not all, embodiments of the present disclosure. Based on the embodiments of the present disclosure, all other embodiments obtained by those of ordinary skill in the art without inventive labor shall fall within the protection scope of the present disclosure.

The terms used in the embodiments of the present disclosure are only for the purpose of describing particular embodiments, and are not intended to limit the present disclosure. The singular forms "a", "one" and "the" used in the embodiments of the present disclosure are also intended to include most forms, unless the context clearly indicates other meanings.

It should be understood that the term "and/or" used in the present disclosure is only an association relationship to describe the associated objects, indicating that there may be three kinds of relationships, for example, A and/or B, which may indicate that there are three situations: A alone, both A and B, and B alone. In addition, the character "/" in the present disclosure generally indicates that the forward-backward correlation object is an "or" relationship.

Depending on the context, the words "in case of", "if" as used herein may be interpreted as "at" or "when" or "in response to determination" or "in response to detection". Similarly, depending on the context, the phrases "if it is determined" or "if it is detected (stated condition or event)" may be interpreted as "when determining" or "in response to determination" or "when detecting (stated condition or event)" or "in response to detection (stated condition or event)".

The present embodiments firstly provide an application scene of detecting a long-distance optical fiber, and FIG. 1 is a schematic diagram of an application scene of detecting a long-distance optical fiber according to an embodiment of the present disclosure. As shown in FIG. 1, a target node on a to-be-detected optical fiber 101 may send a detection request to a computer device, and in response to the detection request, the computer device respectively sends a first optical signal 102 and a second optical signal 103 from each end of the to-be-detected optical fiber 101, then the first optical signal 102 propagates on the to-be-detected optical fiber 101 to form a first sampling sequence {(36 dB, 1), ..., (31 dB, 25), ..., (26 dB, 50), ..., (21 dB, 75), ..., (16 dB, 100), ..., (11 dB, 125), ..., (6 dB, 150), ...}; and the second optical signal 103 propagates on the to-be-detected optical fiber to form a second sampling sequence { ..., [6 dB, 100], ..., [11 dB, 125], ..., [16 dB, 150], ..., [21 dB, 175], ..., [26 dB, 200], ..., [31 dB, 225], ..., [36 dB, 250]}; wherein (36 dB, 1) indicates that the relative value of the optical power of the to-be-detected optical fiber 102 at the sampling point numbered 1 on the to-be-detected optical fiber 101 is 36 dB, [21 dB, 175] indicates that the relative value of the optical power of the to-be-detected optical fiber 103 at the sampling point numbered 175 on the to-be-detected optical fiber 101 is 21 dB.

Similarly, the relative value of the optical power at any sampling point on the to-be-detected optical fiber 101 can be known.

According to the first sampling sequence, the second sampling sequence and the total length of the to-be-detected optical fiber, a detection result can be generated which can reflect the situation on a whole to-be-detected optical fiber 101, and the detection result can be sent to the target node.

The present embodiment proposes a long-distance optical fiber detecting method. The method is applied to a long-distance optical fiber detecting device, and the function realized by the method can be realized by calling program codes via a processor in the device. Of course, the program codes may be stored in a computer storage medium, thus it can be seen that the device includes at least a processor and a storage medium.

FIG. 2 is a schematic flowchart of a long-distance optical fiber detecting method according to an embodiment of the present disclosure. As shown in FIG. 2, the method comprises following steps.

At step 202, in response to a detection request of a target node on a to-be-detected optical fiber, a first sampling sequence and a second sampling sequence that are formed by respectively propagating, on the to-be-detected optical fiber, a first optical signal and a second optical signal respectively sent from each end of the to-be-detected optical fiber through an OTDR are determined.

The device includes a long-distance optical fiber detecting apparatus and an OTDR module, and the method provided by the embodiment of the present disclosure is executed by the long-distance optical fiber detecting apparatus. The OTDR module is configured to, in response to a detection request of a target node on a to-be-detected optical fiber, send a first optical signal and obtain a first sampling sequence formed by propagating the first optical signal on the to-be-detected optical fiber, or, send a second optical signal and obtain a second sampling sequence formed by propagating the second optical signal on the to-be-detected optical fiber.

The long-distance optical fiber detecting apparatus, in response to the detection request of the target node on the to-be-detected optical fiber, triggers the OTDR module to send the first optical signal or the second optical signal, and respectively obtains the first sampling sequence and the second sampling sequence formed by respectively propagating the first optical signal or the second optical signal on the to-be-detected optical fiber; wherein the long-distance optical fiber detecting apparatus obtains the first sampling sequence or the second sampling sequence from an OTDR module on a local end node, and receives the second sampling sequence or the first sampling sequence obtained by an OTDR module on an opposite end node. In this way, the local end node can obtain the first sampling sequence and the second sampling sequence at the same time.

It should be noted that the local end node and the opposite end node both are provided with a communication module, and the communication module comprises an information sending module and an information receiving module. The local end node sends information such as a sampling sequence (a first sampling sequence or a second sampling sequence) of the local end node (a time stamp for sending an optical signal is also comprised in the following embodiments) to the opposite end node through the information sending module, and the local end node can also receive information such as a sampling sequence obtained by the opposite end node through the information receiving module.

The target node herein comprises, but is not limited to, a node on the to-be-detected optical fiber, and the target node may be any node of the to-be-detected optical fiber that has a detection requirement.

The first optical signal may be an optical signal sent by a laser of a first optical time-domain reflectometer installed at one end of the to-be-detected optical fiber, and the second optical signal may be an optical signal sent by a laser of a second optical time-domain reflectometer installed at the other end of the to-be-detected optical fiber. The first sampling sequence is a sequence composed of corresponding optical power relative values of the first optical signal recorded at each sampling point of the to-be-detected optical fiber; and the second sampling sequence is a sequence composed of corresponding optical power relative values of the second optical signal recorded at each sampling point of the to-be-detected optical fiber; wherein the calculation formula of the optical power relative values may be: the optical power relative values=10 lg optical power absolute value/1 MW (megawatt), where the unit may be dB.

At step 204, the total length of the to-be-detected optical fiber is determined.

In the related technologies, in a case where the line length of the long-distance optical fiber line exceeds a dynamic range of the OTDR, the OTDR will not be able to detect the information about the distal optical fiber. In the embodiment of the present disclosure, by means of respectively providing one OTDR at each end of the to-be-detected optical fiber, and by means of respectively sending the first optical signal and the second optical signal by the OTDR at each end of the to-be-detected optical fiber, a first sampling sequence formed by propagating the first optical signal on the to-be-detected optical fiber and a second sampling sequence formed by propagating the second optical signal on the to-be-detected optical fiber are obtained. In this way, although the total length of the to-be-detected optical fiber in the embodiment of the present disclosure is also limited to the dynamic range of the optical time-domain reflectometer, however, in a case of where the total length of the to-be-detected optical fiber is larger than or equal to the measurement range of the optical time-domain reflectometer but less than or equal to twice the measurement range of the optical time-domain reflectometer, an accurate detection result can still be provided.

In the embodiment of the present disclosure, the total length of the to-be-measured line may generally be less than or equal to twice the dynamic range of the optical time-domain reflectometer, and in a case where the dynamic range of the optical time-domain reflectometer is several kilometers (km), the total length of the to-be-measured line is about ten to twenty kilometers. At present, the dynamic range of the optical time-domain reflectometer is about 150 kilometers. Therefore, in order to improve the measurement effect, the total length of the to-be-measured line is generally at a distance of the magnitude of hundreds of kilometers, such as 250 km, 300 km and the like.

During the implementation process, step 204 may be realized in various ways. For example, in a case where a user knows the total line length, the user may set the total length of the to-be-detected optical fiber by means of the user interface, so that realizing the total length of the to-be-detected optical fiber is determined by the device. For another example, the target node having the detection requirement may carry the total length of the to-be-tested optical fiber in the sent detection request, and the local end node obtains the total length of the to-be-detected optical fiber by means of analyzing the detection request, so as to realize determining the total length of the to-be-detected optical fiber. For a further example, it can also be that the local end node sends an optical signal to the opposite end node, and the total length of to-be-detected optical fiber is calculated by a speed of light and a propagation duration, so as to realize determining the total length of the to-be-detected optical fiber. For another example, the local end node may also receive the total length of the to-be-detected optical fiber determined by the opposite end node, so as to obtain the total length of the to-be-detected optical fiber.

At step 206, a detection result is generated according to the first sampling sequence, the second sampling sequence and the total length.

At step 208, the detection result is sent to the target node.

In the embodiment of the present disclosure, by means of determining a first sampling sequence and a second sampling sequence that are formed by respectively propagating, on a to-be-detected optical fiber, a first optical signal and a second optical signal respectively sent from each end of the to-be-detected optical fiber through an OTDR, and combining with a total length of the to-be-detected optical fiber, a detection result of the to-be-detected optical fiber is generated, so that when the optical fiber is long, full coverage detection of the entire to-be-detected optical fiber can be realized, thereby improving the reliability of optical fiber detection.

Figure 8:
FIG. 8 is a flowchart of a long-distance optical fiber detecting method according to an embodiment of the present disclosure.

An embodiment of the present disclosure further provides a long-distance optical fiber detecting method. Compared with the embodiment shown in FIG. 2, the first sampling sequence is obtained by sampling the first optical signal sent by the sending node, the second sampling sequence is obtained by sampling the second optical signal sent by the receiving node, and sampling points in the first and second sampling sequence are numbered from the sending node to the receiving node in an increasing sequence, respectively. As shown in FIG. 8, the method provided in the embodiment of the present disclosure may include step 302 to step 330.

At step 302, in response to a detection request of a target node on a to-be-detected optical fiber, a first sampling sequence and a second sampling sequence that are formed by respectively propagating, on the to-be-detected optical fiber, a first optical signal and a second optical signal respectively sent from each end of the to-be-detected optical fiber through an OTDR.

The device includes a long-distance optical fiber detecting apparatus and an OTDR module, and the method provided by the embodiment of the present disclosure is executed by the long-distance optical fiber detecting apparatus. The OTDR module is configured to, in response to a detection request of a target node on a to-be-detected optical fiber, send a first optical signal and obtain a first sampling sequence formed by propagating the first optical signal on the to-be-detected optical fiber, or, send a second optical signal and obtain a second sampling sequence formed by propagating the second optical signal on the to-be-detected optical fiber. The long-distance optical fiber detecting apparatus, in response to the detection request of the target node on the to-be-detected optical fiber, triggers the OTDR module to send the first optical signal or the second optical signal, and respectively obtains the first sampling sequence and the second sampling sequence formed by respectively propagating the first and second optical signal on the to-be-detected optical fiber.

Referring to FIG. 1, the first sampling sequence formed by the propagation of the first optical signal 102 on the to-be-detected optical fiber is {(36 dB, 1), ..., (31 dB, 25), ..., (26 dB, 50), ..., (21 dB, 75), ..., (16 dB, 100), ..., (11.2 dB, 124), (11 dB, 125), ..., (6 dB, 150), ...}; and the second sampling sequence formed by the propagation of the second optical signal 103 on the to-be-detected optical fiber is { ..., [6 dB, 100], ..., [11 dB, 125], ..., [16 dB, 150], ..., [21 dB, 175], ..., [26 dB, 200], ..., [31 dB, 225], ..., [36 dB, 250]}.

At step 304, a sending time of a third optical signal recorded by a sending node is determined, the third optical signal being used for measuring the to-be-detected optical.

The third optical signal may be an optical signal sent by a laser of a first optical time-domain reflectometer, or may be an optical signal sent by a laser of a second optical time-domain reflectometer, or may also be an optical signal sent by any laser installed at an end of the to-be-detected optical fiber.

In some embodiments, in a case where the local end node is used as the sending node of the third optical signal, the local end node will record the time stamp of sending the third optical signal as the sending time of the third optical signal; meanwhile, the local end node will also receive the receiving time of the third optical signal sent by the receiving node of the third optical signal. In some other embodiments, in a case where the local end node is used as the receiving node of the third optical signal, the local end node will record the time stamp of receiving the third optical signal as the receiving time of the third optical signal; meanwhile, the local end node will also receive the sending time of the third optical signal sent by the sending node of the third optical signal.

At step 306, a receiving time of the third optical signal recorded by a receiving node is determined.

The sending node and the receiving node are nodes respectively located at each end of the to-be-detected optical fiber.

At step 308, a propagation duration of the third optical signal on the to-be-detected optical fiber is determined according to the sending time and the receiving time.

The difference between the receiving time and the sending time may be determined as the propagation duration of the third optical signal on the to-be-detected optical fiber.

At step 310, a total length of the to-be-detected optical fiber is determined according to the propagation duration.

The propagation speed v, v=c/n, of the light in the to-be-detected optical fiber may be calculated according to the propagation speed c of light in vacuum and the refractive index n of the to-be-detected optical fiber; then the total length s, s=vT, of the to-be-detected optical fiber is determined according to the propagation speed v and the propagation duration T.

In the embodiment of the present disclosure, step 304 to step 310 provide an implementation to realize step 204, "determining the total length of the to-be-detected optical fiber", wherein by recording the sending time and the receiving time of the third optical signal, the propagation duration of the third optical signal is determined, and according to the propagation duration, the total length of the to-be-detected optical fiber is determined. As a result, the total length of the to-be-detected optical fiber can be determined more conveniently and accurately.

At step 312, a ratio between ½ of the total length and a distance between two adjacent sampling points is determined.

The distance between any two adjacent sampling points on the to-be-detected optical fiber may be equal; the total length may be s=250 kilometers, the distance between two adjacent sampling points may be m=1 kilometer, then the ratio is s/2m=125.

At step 314, in a case where a serial number of a sampling point in the first sampling sequence is less than the ratio, the sampling point is added to a first sampling subsequence of the first sampling sequence.

The first sampling sequence is obtained by sampling the first optical signal sent by the sending node, and the second sampling sequence is obtained by sampling the second optical signal sent by the receiving node, and then sampling points in the first and second sampling sequence are numbered from the sending node to the receiving node in an increasing sequence, respectively; as the serial numbers of the sampling points in the first sampling sequence increase progressively, the optical power relative values of the first optical signal sampled at the sampling points gradually decrease, and in a case where the optical power relative value of the first optical signal is less than or equal to a certain value, part or all of the properties of the first optical signal cannot be accurately analyzed, and therefore, a first sampling subsequence of sampling points with smaller serial numbers capable of effectively analyzing the properties of the first optical signal needs to be intercepted from the first sampling sequence.

Referring to FIG. 1, assuming that the certain value is 11 dB, when the serial number of the sampling point is 125, the optical power relative value of the first optical signal is 11 dB, and when the serial number of the sampling point is 150, the optical power relative value of the first optical signal is 6 dB, then in a case where a serial number of a sampling point is larger than or equal to 125, part or all of the properties of the first optical signal will not be able to be accurately analyzed. Therefore, it is necessary to intercept from the first sampling sequence the first sampling subsequence which can effectively analyze the properties of the first optical signal that the sampling points are less than the ratio 125; that is, the first sampling subsequence is {(36 dB, 1), . . . , (31 dB, 25), . . . , (26 dB, 50), . . . , (21 dB, 75), . . . , (16 dB, 100), . . . , (11.2 dB, 124)}.

At step 316, the first sampling subsequence is analyzed, so as to obtain a first detection sub-result.

The first detection sub-result may be a first optical power relative value curve indicating the changes of the optical power relative values of sampling points in the first sampling subsequence, and whether a protrusion appears on the first optical power relative value curve can indicate whether an event occurs in an area of the to-be-detected optical fiber corresponding to the first sampling subsequence; the event may be that the connector on the to-be-detected optical fiber is not properly connected, the to-be-detected optical fiber is slightly bent, and the like.

Referring to FIG. 3A, a first sampling subsequence of sampling points with serial numbers less than 125 may be analyzed, so as to obtain a first optical power relative value curve 301a, where the distance on the horizontal coordinate in FIG. 3a represents a distance from the sending node; it is taken as an example for explanation that the total length of the to-be-detected optical fiber is 250 kilometers (km) and the distance of a certain sampling point is 100 kilometers, the distance between the sampling point and the sending node is 100 kilometers, i.e. the serial number corresponding to the sampling point is 100, and the optical power relative value of the first optical signal at the sampling point is 16 dB.

At step 318, in a case where a serial number of a sampling point in a second sampling sequence is larger than or equal to the ratio, the sampling point is added to the second sampling subsequence of the second sampling sequence.

As the serial numbers of the sampling points in the second sampling sequence increases progressively, the optical power relative values of the second optical signal sampled by the sampling points gradually increase. In a case where an optical power relative value of the second optical signal is larger than a certain value, the properties of the second optical signal can be accurately analyzed. Therefore, a second sampling subsequence of sampling points having larger serial numbers which is capable of effectively analyzing the properties of the second optical signal needs to be intercepted from the second sampling sequence.

Referring to FIG. 1, assuming that the certain value is 11 dB, when the serial number of the sampling point is 100, the optical power relative value of the second optical signal is 6 dB; when the serial number of the sampling point is 125, the optical power relative value of the second optical signal is 11 dB; and when the serial number of the sampling point is 150, the optical power relative value of the second optical signal is 6 dB, then in a case where the serial number of the sampling point is larger than or equal to 125, part or all of the properties of the second optical signal can be accurately analyzed. Therefore, the second sampling subsequence of sampling points having serial numbers larger or equal to the ratio 125, which can effectively analyze the properties of the second signal needs to be intercepted from the first sampling sequence, i.e. the second sampling subsequence is {[11 dB, 125], . . . , [16 dB, 150], . . . , [21 dB, 175], . . . , [26 dB, 200], . . . , [31 dB, 225], . . . , [36 dB, 250]}.

At step 320, the second sampling subsequence is analyzed, so as to obtain a second detection sub-result.

The second detection sub-result may be a second optical power relative value curve indicating the changes of the optical power relative values of sampling points in the second sampling subsequence, and similar to the first optical power relative value curve, whether a protrusion appears on the second optical power relative value curve can indicate whether an event occurs in an area of the to-be-detected optical fiber corresponding to the first sampling subsequence.

Figure 3B:
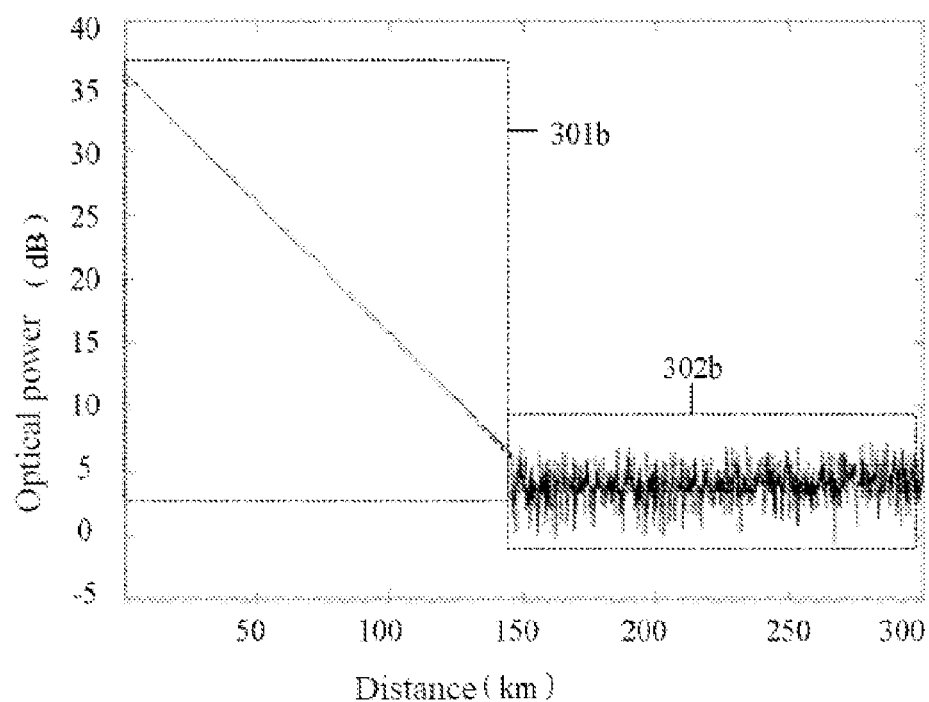
FIG. 3b is a schematic diagram of a second sampling sequence according to an embodiment of the present disclosure.

Referring to FIG. 3b, a second sampling subsequence of sampling points whose serial number are larger than or equal to 125 may be analyzed, so as to obtain a second optical power relative value curve 301b, where a distance in FIG. 3b represents a distance from a receiving node. For example, it is taken as an example for explanation that the total length of the to-be-detected optical fiber is 250 kilometers and the distance of a certain sampling point is 100 kilometers (km), then the distance between the sampling point and the sending node is 250−100=150 kilometers, i.e. the serial number corresponding to the sampling point is 150, and the optical power relative value of the second optical signal at the sampling point is 16 dB.

At step 322, a detection result is generated according to the first detection sub-result and the second detection sub-result.

Since the first optical power relative value curve and the second optical power relative value curve can respectively indicate whether an event occurs in an area of the to-be-detected optical fiber corresponding to the first sampling subsequence and the second sampling subsequence, and the first sampling subsequence and the second sampling subsequence can cover the entire to-be-detected optical fiber, the first optical power relative value curve and the second optical power relative value curve can be integrated, so as to obtain the detection result curve corresponding to the detection results that can indicate whether an event occurs on the entire to-be-detected optical fiber.

Figure 4A:
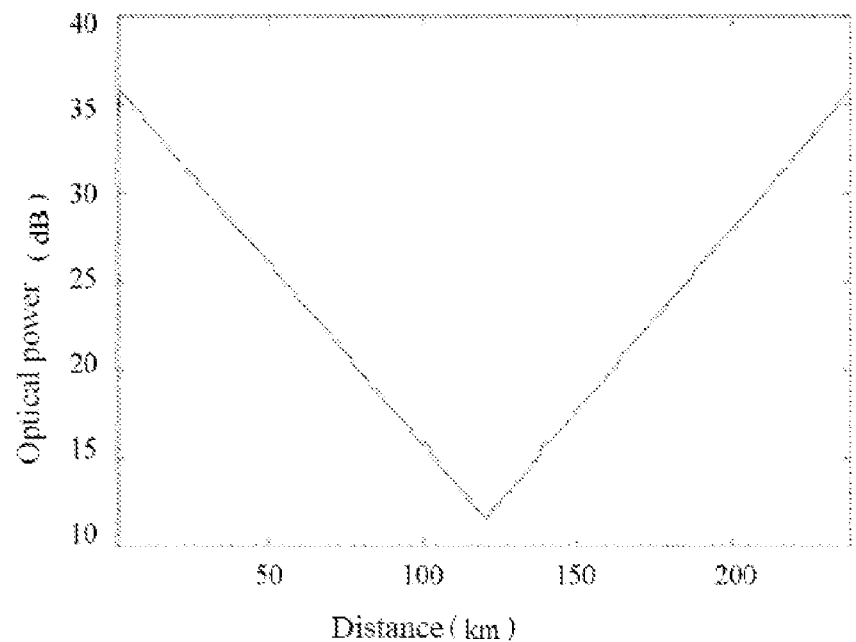
FIG. 4a and FIG. 4b are schematic diagrams of detection results corresponding to a whole to-be-detected optical fiber according to an embodiment of the present disclosure.

Referring to FIG. 4a, the first optical power relative value curve 301a and the second optical power relative value curve 301b can be integrated, so as to obtain the detection result curve.

In the embodiment of the present disclosure, the detection sub-results are obtained by respectively intercepting the effective subsequences of the first sampling subsequence and the second sampling subsequence and by respectively analyzing the intercepted effective subsequences, and the detection result is generated according to the two detection sub-results. Therefore, the generated detection result can be made more accurately.

At step 324, the detection result is sent to the target node.

At step 326, in a case where the detection result does not meet a preset condition, a third sampling sequence and a fourth sampling sequence that are formed by respectively propagating, on the to-be-detected optical fiber, a fourth optical signal and a fifth optical signal sent from the each end of the to-be-detected optical fiber through the OTDR.

The preset condition may be that a fluctuation curve (the fluctuation curve 302a as shown in FIG. 3a or the fluctuation curve 302b as shown in FIG. 3b) does not exist in the detection result curve; a fluctuation curve existing in a detection result curve means that the dynamic ranges of the first optical time-domain reflectometer and the second optical time-domain reflectometer are insufficient; the dynamic range of an optical time-domain reflectometer is a dB difference between an initial backscatter level and a noise level, and the dynamic range of an optical time-domain reflectometer determines a maximum measurable length of the optical time-domain reflectometer for the to-be-detected optical fiber.

The fourth optical signal may be an optical signal sent by a laser of the third optical time-domain reflectometer, and the fifth optical signal may be an optical signal sent by a laser of the fourth optical time-domain reflectometer. The third sampling sequence is a sequence composed of corresponding optical power relative values of the fourth optical signal recorded at each sampling point of the to-be-detected optical fiber, and the fourth sampling sequence is a sequence composed of corresponding optical power relative values of the fifth optical signal recorded at each sampling point of the to-be-detected optical fiber; the sum of the dynamic ranges of the third optical time-domain reflectometer and the fourth optical time-domain reflectometer is larger than the sum of the dynamic ranges of the first optical time-domain reflectometer and the second optical time-domain reflectometer.

At step 328, an update detection result is regenerated according to the third sampling sequence, the fourth sampling sequence and the total length.

At step 330, the update detection result is sent to the target node.

In the embodiment of the present disclosure, in a case where the dynamic ranges of the first optical time-domain reflectometer and the second optical time-domain reflectometer are limited, the third optical time-domain reflectometer and the fourth optical time-domain reflectometer having larger dynamic ranges are used instead. Therefore, in a case where the optical fiber is long, the coverage of the detection of the entire to-be-detected optical fiber can be improved, thereby improving the reliability of the optical fiber detection.

Figure 9:
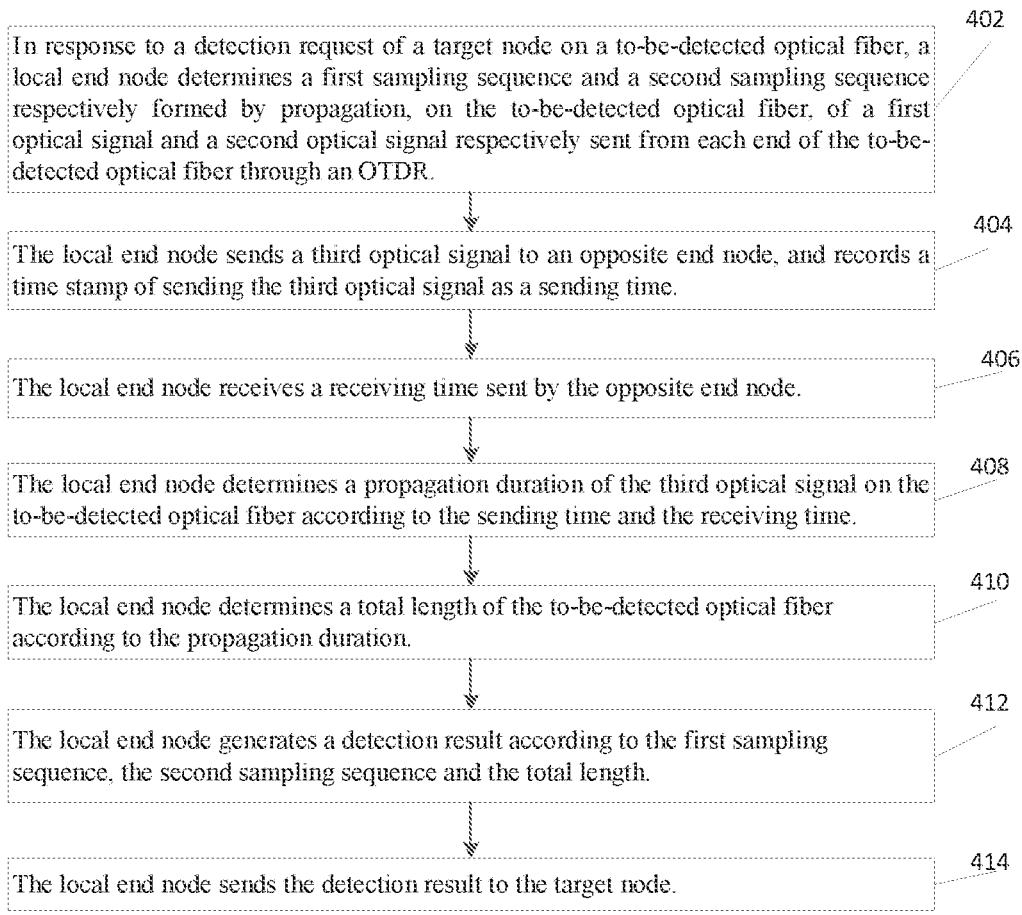
FIG. 9 is a flowchart of a long-distance optical fiber detecting method according to an embodiment of the present disclosure.

The embodiments of the present disclosure further provide a long-distance optical fiber detecting method. In the method, it is taken as an example for explanation that a local end node is used as a sending node and an opposite end node is used as a receiving node. As shown in FIG. 9 the method may include step 402 to step 414.

At step 402, in response to a detection request of a target node on a to-be-detected optical fiber, a local end node determines a first sampling sequence and a second sampling sequence respectively formed by propagation, on the to-be-detected optical fiber, of a first optical signal and a second optical signal respectively sent from each end of the to-be-detected optical fiber through an OTDR.

The device includes a long-distance optical fiber detecting apparatus and an OTDR module, and the method provided by the embodiments of the present disclosure is executed by the long-distance optical fiber detecting apparatus. The OTDR module is configured to, in response to a detection request of a target node on a to-be-detected optical fiber, send a first optical signal and obtain a first sampling sequence formed by propagation of the first optical signal on the to-be-detected optical fiber, or, send a second optical signal and obtain a second sampling sequence formed by propagation of the second optical signal on the to-be-detected optical fiber. The long-distance optical fiber detecting apparatus, in response to a detection request of a target node on a to-be-detected optical fiber, triggers the OTDR module to send a first optical signal or a second optical signal, and respectively obtains a first sampling sequence and a second sampling sequence respectively formed by propagation of the first and second optical signals on the to-be-detected optical fiber.

At step 404, the local end node sends a third optical signal to an opposite end node, and records a time stamp of sending the third optical signal as a sending time.

At step 406, the local end node receives a receiving time sent by the opposite end node.

At step 408, the local end node determines a propagation duration of the third optical signal on the to-be-detected optical fiber according to the sending time and the receiving time.

At step 410, the local end node determines a total length of the to-be-detected optical fiber according to the propagation duration.

At step 412, the local end node generates a detection result according to the first sampling sequence, the second sampling sequence and the total length.

At step 414, the local end node sends the detection result to the target node.

In the embodiment of the present disclosure, the sending node of the third optical signal records the sending time, and receives the receiving time sent by the receiving node, so that the sending time and the receiving time of the third optical signal can be recorded more accurately.

Figure 10:
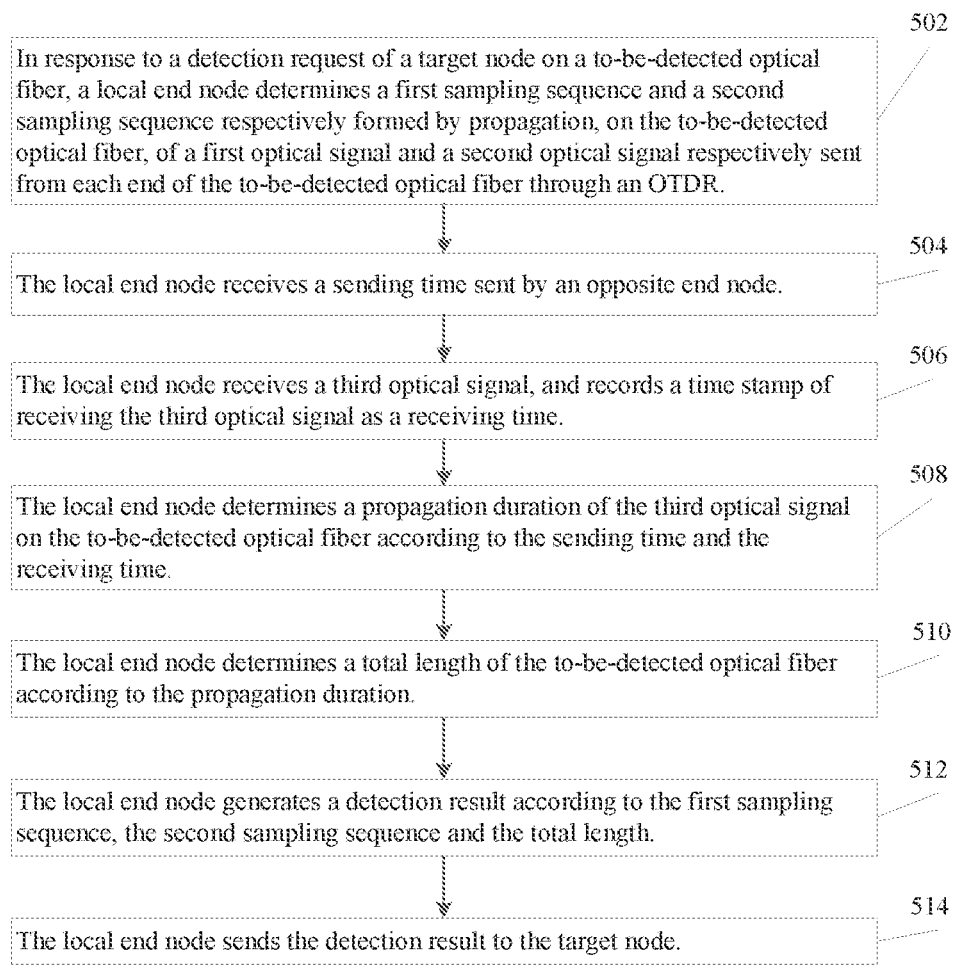
FIG. 10 is a flowchart of a long-distance optical fiber detecting method according to an embodiment of the present disclosure.

A long-distance optical fiber detecting method is further provided by an embodiment of the present disclosure. In the method, it is taken as an example for explanation that a local end node is used as a receiving node and an opposite end node is used as a sending node. As shown in FIG. 10, the method may include step 502 to step 514.

At step 502, in response to a detection request of a target node on a to-be-detected optical fiber, a local end node determines a first sampling sequence and a second sampling sequence respectively formed by propagation, on the to-be-detected optical fiber, of a first optical signal and a second optical signal respectively sent from each end of the to-be-detected optical fiber through an OTDR.

The device includes a long-distance optical fiber detecting apparatus and an OTDR module, and the method provided by the embodiment of the present disclosure is executed by the long-distance optical fiber detecting apparatus. The OTDR module is configured to, in response to a detection request of a target node on a to-be-detected optical fiber, send a first optical signal and obtain a first sampling sequence formed by propagation of the first optical signal on the to-be-detected optical fiber, or, send a second optical signal and obtain a second sampling sequence formed by propagation of the second optical signal on the to-be-detected optical fiber.

The long-distance optical fiber detecting apparatus, in response to the detection request of the target node on the to-be-detected optical fiber, triggers the OTDR module to send the first optical signal or the second optical signal, and respectively obtains the first sampling sequence and the second sampling sequence respectively formed by propagating the first and second optical signal on the to-be-detected optical fiber.

At step 504, the local end node receives a sending time sent by an opposite end node.

At step 506, the local end node receives a third optical signal, and records a time stamp of receiving the third optical signal as a receiving time.

At step 508, the local end node determines a propagation duration of the third optical signal on the to-be-detected optical fiber according to the sending time and the receiving time.

At step 510, the local end node determines a total length of the to-be-detected optical fiber according to the propagation duration.

At step 512, the local end node generates a detection result according to the first sampling sequence, the second sampling sequence and the total length.

At step 514, the local end node sends the detection result to the target node.

In the embodiment of the present disclosure, the receiving node of the third optical signal records the receiving time, and receives the sending time sent by the send node. Therefore, not only the sending time and the receiving time of the third optical signal can be recorded through the sending node, but also the receiving time and the sending time of the third optical signal can be recorded by the receiving node, thereby improving the diversity of determining the sending time and the receiving time of the third optical signal.

Figure 11:
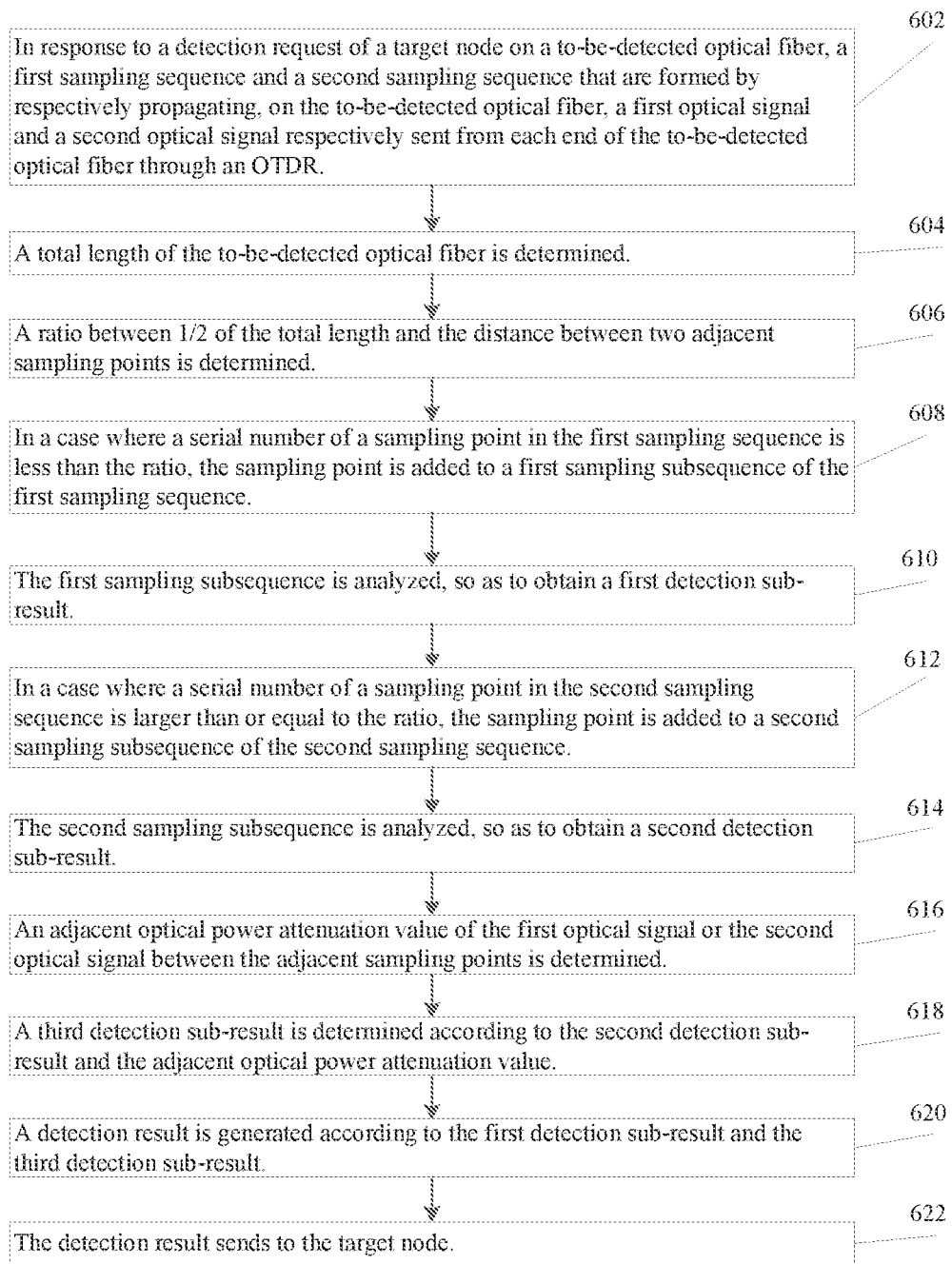
FIG. 11 is a flowchart of a long-distance optical fiber detecting method applied to any end node of the to-be-detected optical fiber according to an embodiment of the present disclosure.

An embodiment of the present disclosure provides a long-distance optical fiber detecting method which is applied to any end node of the to-be-detected optical fiber. As shown in FIG. 11, the method may include following step 602 to step 622.

At step 602, in response to a detection request of a target node on a to-be-detected optical fiber, a first sampling sequence and a second sampling sequence that are formed by respectively propagating, on the to-be-detected optical fiber, a first optical signal and a second optical signal respectively sent from each end of the to-be-detected optical fiber through an OTDR.

The device includes a long-distance optical fiber detecting apparatus and an OTDR module, and the method provided by the embodiment of the present disclosure is executed by the long-distance optical fiber detecting apparatus. The OTDR module is configured to, in response to a detection request of a target node on a to-be-detected optical fiber, send a first optical signal, and obtain a first sampling sequence formed by propagation of the first optical signal on the to-be-detected optical fiber, or, send a second optical signal, and obtain a second sampling sequence formed by propagation of the second optical signal on the to-be-detected optical fiber. The long-distance optical fiber detecting apparatus, in response to the detection request of the target node on the to-be-detected optical fiber, triggers the OTDR module to send the first optical signal or the second optical signal, and respectively obtains the first sampling sequence and the second sampling sequence that are formed by respectively propagating the first and second optical signals on the to-be-detected optical fiber.

At step 604, a total length of the to-be-detected optical fiber is determined.

At step 606, a ratio between ½ of the total length and the distance between two adjacent sampling points is determined.

At step 608, in a case where a serial number of a sampling point in the first sampling sequence is less than the ratio, the sampling point is added to a first sampling subsequence of the first sampling sequence.

At step 610, the first sampling subsequence is analyzed, so as to obtain a first detection sub-result.

At step 612, in a case where a serial number of a sampling point in the second sampling sequence is larger than or equal to the ratio, the sampling point is added to a second sampling subsequence of the second sampling sequence.

At step 614, the second sampling subsequence is analyzed, so as to obtain a second detection sub-result.

At step 616, an adjacent optical power attenuation value of the first optical signal or the second optical signal between the adjacent sampling points is determined.

The adjacent optical power attenuation value may be a difference between the optical power relative values corresponding to adjacent sampling points.

At step 618, a third detection sub-result is determined according to the second detection sub-result and the adjacent optical power attenuation value.

In one embodiment, a second relative optical power curve corresponding to the second detection sub-results in the detection result curve in FIG. 4*a* may be transformed, so as to obtain a third optical power relative value curve corresponding to the third detection sub-result.

At step 620, a detection result is generated according to the first detection sub-result and the third detection sub-result.

Figure 4B:
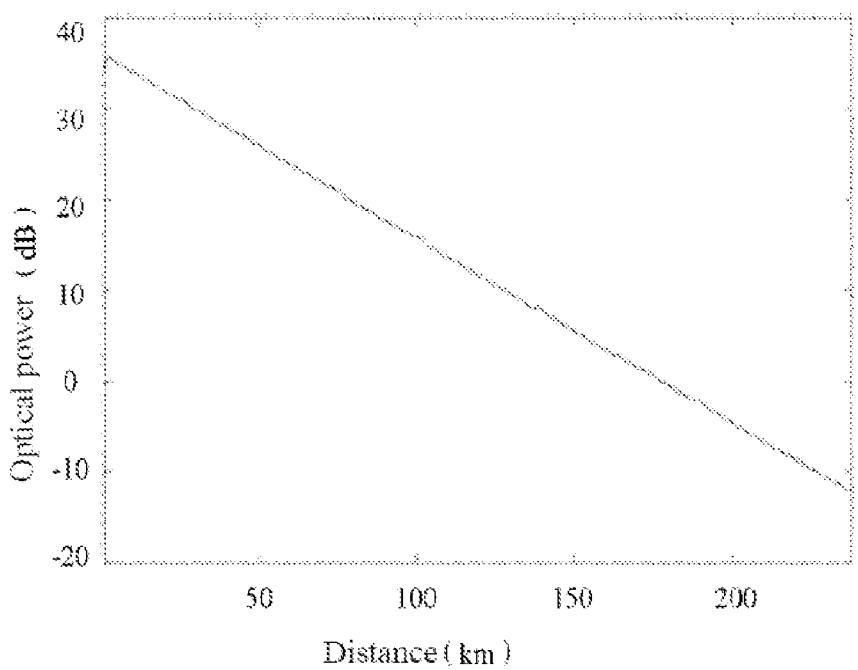

Referring to FIG. 4*b*, the first optical power relative value curve corresponding to the first detection sub-result and the third optical power relative value curve corresponding to the third detection sub-result can be integrated, so as to obtain a more intuitive detection result curve as shown in FIG. 4*b*.

At step 622, the detection result sends to the target node.

In the embodiment of the present disclosure, the third detection sub-result is determined through the adjacent optical power attenuation value and the second detection sub-result, and the detection result is generated according to the third detection sub-result and the first detection sub-result, so that the detection result can be indicated more intuitively.

In a case of construction and maintenance of optical cable lines, an optical time-domain reflectometer (OTDR) is usually used to test characteristics of optical fibers in optical cables. The optical fiber detection may improve the quality of the system connection, and reduce fault factors and find a fault point of the optical fiber under a condition of fault. The optical fiber detection generally includes the test of the attenuation of optical power. The OTDR is also an important apparatus of the online monitoring system in the optical communication network, and the OTDR can know the uniformity, defect, fracture, joint coupling and other properties of the optical fiber through analyzing a measure curve. The dynamic range is one of the important technical indexes of the OTDR, and the dynamic range of the OTDR is a dB difference between an initial backscattering level and a noise level. The larger the dynamic range of the OTDR, the better the curve line type, and the longer the distance of the optical communication line that can be monitored. However, the dynamic range of a single OTDR may not be able to meet the detection requirements of long-distance fiber optic lines. For lines exceeding a certain length, the OTDR will not be able to detect the information about the distal optical fiber. In an embodiment of the present disclosure, a method of using one OTDR at each end to perform detection may be used; that is, measurement is performed at the other end of the fiber with another OTDR, thereby obtaining information about an optical fiber near the other end.

The embodiments of the present disclosure relate to the technical field of optical time-domain reflectometers, and provide a method and an apparatus for detecting a long-distance optical fiber by using an optical time-domain reflectometer (OTDR).

Figure 7:
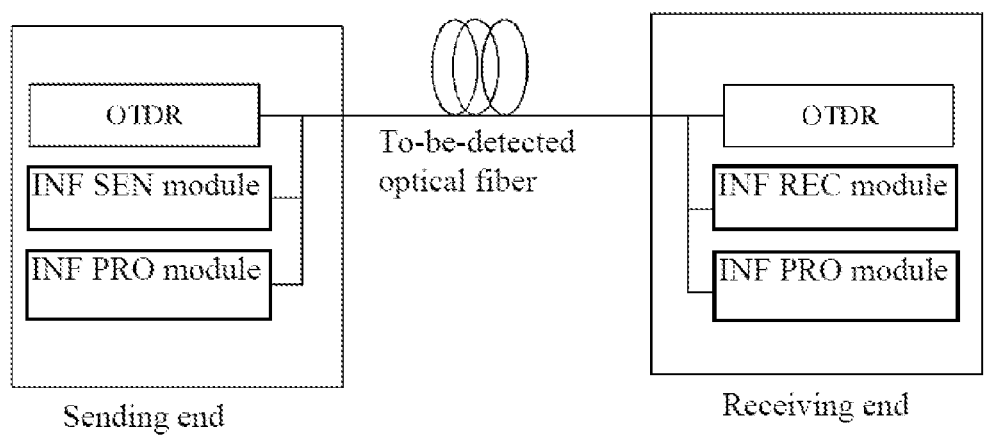
FIG. 7 is a schematic diagram of the structural composition of another long-distance optical fiber detecting apparatus according to an embodiment of the present disclosure.

The apparatus includes two parts, see FIG. 7, which are respectively a sending end and a receiving end, respectively connected to both ends of a to-be-detected optical fiber. The sending end at least needs to comprise one OTDR module and one information sending module (INF SEN module), and the receiving end at least needs to comprise at least one OTDR module and one information receiving module (INF REC module). Another one or more information processing modules (INF PRO modules) may exist at both the sending end and the receiving end, or may exist at only one of the two ends. Alternatively, they exist independently in other positions that can communicate with the sending end and the receiving end, and the OTDR modules at the both ends of the optical fiber respectively transmit the result to the information processing module after completing the test. The total length of the line is calculated via recording the transmission time of one signal from the sending end to the receiving end by the information sending module and the information receiving module. The information processing module calculates and generates a final test result through the test results of the OTDRs at the both ends and the total length of the line. The technical solution of the long-distance optical fiber detection according to the embodiment of the present disclosure can correctly integrate the measurement results of the OTDRs at both ends of the line into a single measurement result, and accurately indicate the state of the entire line. Even if an event occurs near the end point, the OTDR at the initial end can also quickly obtain the information, so that a distal event can be detected more reliably.

In an embodiment of the present disclosure, the OTDR modules at the sending end and the receiving end respectively detect the optical fiber line from two directions, and send the detection results to the information processing module.

In an embodiment of the present disclosure, the information receiving module receives the signal sent by the information sending module, records the time t required by the signal from the sending end to the receiving end, and transmits the time t to the information processing module.

In an embodiment of the present disclosure, the sent signal may be an optical signal generated by using a laser in the OTDR module, or may be a signal generated in other ways and existing in any form.

In an embodiment of the present disclosure, the information processing module can calculate the total length s of the line through the time t required by the signal from the sending end to the receiving end and by combining the transmission speed v of the signal in the line, and the calculation formula is $s=vt$.

In an embodiment of the present disclosure, a single measurement result can be obtained by means of the integration according to the total length of the line and the test results of the OTDR modules at the both ends, and all the conditions of the whole line can be accurately indicated.

An embodiment of the present disclosure provides a OTDR-based long-distance optical fiber detecting apparatus, including two parts, i.e. a receiving end and a sending end, wherein the sending end at least needs to comprise one OTDR module and one information sending module, and the receiving end at least needs to comprise one OTDR module and one information receiving module. Another one or more information processing modules may exist at both the sending end and the receiving end, or may exist at only one of the two ends.

The OTDR modules are connected to the both ends of the to-be-detected optical fiber under the working condition, and are configured to respectively measure the optical fiber from two directions, so that the measurement result of the OTDR at one end can cover optical fibers outside the measurement range of the OTDR module at the other end. After the measurement is finished, the test result is transmitted to all the information processing modules.

The information sending module and the information receiving module are configured to calculate the total length of the to-be-detected optical fiber through the propagation speed and the propagation time of the information in the medium.

The information processing module is configured to analyze and process the measurement results of the OTDRs at both ends, and obtain the final measurement result in combination with the measured total length of the optical fiber.

In an embodiment of the present disclosure, the sum of the measurable distances of the OTDRs at both ends should be larger than or equal to the total length of the optical fiber.

In an embodiment of the present disclosure, the information sending module can use various methods to generate a signal for testing the length of the optical fiber, including but not limited to borrowing the laser in the OTDR module to send an optical signal as the signal for testing the length of the optical fiber.

In an embodiment of the present disclosure, the information processing module may be respectively provided at multiple places, and may also be provided at only one place, and then send the result to various places with detection requirements.

An embodiment of the present disclosure provides a long-distance optical fiber detecting method which obtains a final result containing the information about the full-segment optical fiber through the measurement results of the OTDRs at both ends, and the detection method comprises:

performing an OTDR test from both ends of an optical fiber to obtain a test result, and transmitting the test result to the information processing module.

A ranging signal is sent from a sending end through an information sending module, and a total distance s of the optical fiber is calculated according to a propagation speed v and a transmission time t of information in a medium under a formula $s=vt$, then a result is sent to the information processing module.

The information processing module obtains a final measurement result through the measurement results of the OTDRs and the total length of the optical fiber, and transmits the final measurement result to various places having detection requirements.

Compared with related technologies, the embodiments of the present disclosure achieve the beneficial effect that they design an apparatus composed of a sending end and a receiving end, and a method, and perform the optical fiber detection from both ends of the optical fiber by using the OTDRs, so that the timeliness of learning the event information about the distal optical fiber can be improved.

An embodiment of the present disclosure provides a long-distance optical fiber detecting apparatus and method, and the detecting apparatus comprises two parts: a sending end device and a receiving end device. The sending end comprises one OTDR module, one information sending module, and one information processing module. The receiving end comprises one OTDR module and one information receiving module. In the present embodiment, the OTDR of the receiving end and the OTDR of the sending end have the same dynamic range and the same working mode, and their maximum measurement ranges are larger than half of the total line length.

The OTDR module of the sending end is started, then measures the to-be-detected optical fiber, so as to obtain the results as shown in FIG. 3a, records the sampling value sequence thereof as $R1(i)$, $i=1,2,3, \ldots n$, where i is the serial number of a sampling point, and n is the total number of sampling points of the OTDR module, and sends the sampling value sequence thereof to the information processing module.

The OTDR module of the receiving end is started, then measures the to-be-detected optical fiber, so as to obtain the results as shown in FIG. 3b, records the sampling value sequence thereof as $R2(i)$, $i=1,2,3, \ldots n$, where n is the total number of sampling points of the OTDR module, and sends the sampling value sequence thereof to the information processing module.

The information sending module and the information receiving module are started to send an optical signal with sufficient power to a to-be-detected optical fiber by using a laser in the OTDR module, to ensure that it can be detected by the information receiving module at the receiving end. A time T of the information transmitting in the optical fiber is measured and recorded. A propagation speed v of light in the optical fiber is calculated according to the speed c of light propagating in the vacuum and a refractive index n of the optical fiber, and a formula is $v=c/n$. Then, a total length s of the optical fiber is calculated under a formula $s=vT$, and is sent to the information processing module.

As shown in FIG. 4a, an optical fiber distance represented by two adjacent sampling points of the OTDR module is recorded as m, and the information processing module is used to calculate the spliced measurement result $R3(i)$ that can indicate the entire line, see the formula (1).

$$R_3(i) = \begin{cases} R_1(i) & \left(i < \frac{s}{2m}\right) \\ R_2\left(\left\lceil \frac{s-im}{m} \right\rceil\right) & \left(i \geq \frac{s}{2m}\right) \end{cases} ; \quad (1)$$

where $\lceil\ \rceil$ represents upward rounding.

Step 716: as shown in FIG. 4b, calculate a more intuitive detection result $R4(i)$, see the formula (2):

$$R_4(i) = \begin{cases} R_3(i) & \left(i < \frac{s}{2m}\right) \\ R_3(i) - 2\eta\left(i - \frac{s}{2m}\right) & \left(i \geq \frac{s}{2m}\right) \end{cases} ; \quad (2)$$

where η is an attenuation value of the optical signal transmitted in an optical fiber having a length of two adjacent sampling point distance. The above-mentioned embodiments are not intended to limit the present disclosure, and any modification, equivalent replacement, and improvement made within the spirit and principle of the present disclosure shall be included in the protection scope of the present disclosure.

Figure 12:
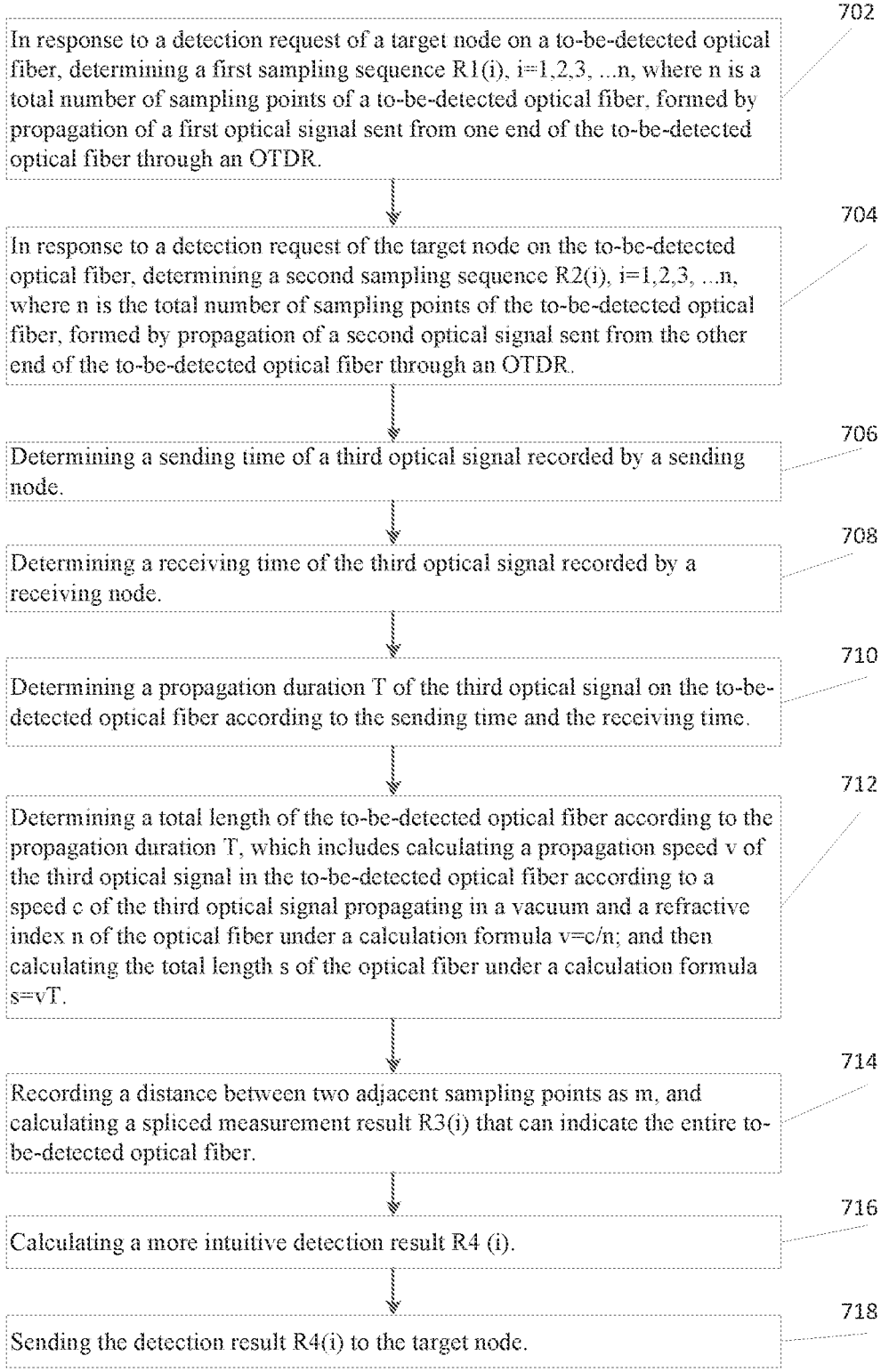
FIG. 12 is a flowchart of a long-distance optical fiber detecting method according to an embodiment of the present disclosure.

An embodiment of the present disclosure provides a long-distance optical fiber detecting method, and as shown in FIG. 12, the method may include step 702 to step 718:

step 702: in response to a detection request of a target node on a to-be-detected optical fiber, determining a first sampling sequence $R1(i)$, $i=1,2,3, \ldots n$, where n is a total number of sampling points of a to-be-detected optical fiber, as shown in FIG. 3a, formed by propagation of a first optical signal sent from one end of the to-be-detected optical fiber through an OTDR;

step 704: in response to a detection request of the target node on the to-be-detected optical fiber, determining a second sampling sequence $R2(i)$, $i=1,2,3, \ldots n$, where n is the total number of sampling points of the to-be-detected optical fiber, as shown in FIG. 3b, formed by propagation of a second optical signal sent from the other end of the to-be-detected optical fiber through an OTDR;

step 706: determining a sending time of a third optical signal recorded by a sending node;

step 708: determining a receiving time of the third optical signal recorded by a receiving node;

step 710: determining a propagation duration T of the third optical signal on the to-be-detected optical fiber according to the sending time and the receiving time;

step 712: determining a total length of the to-be-detected optical fiber according to the propagation duration T, which includes calculating a propagation speed v of the third optical signal in the to-be-detected optical fiber according to a speed c of the third optical signal propagating in a vacuum and a refractive index n of the optical fiber under a calculation formula $v=c/n$; and then calculating the total length s of the optical fiber under a calculation formula $s=vT$;

step 714: recording a distance between two adjacent sampling points as m, as shown in FIG. 4a, and calculating a spliced measurement result $R3(i)$ that can indicate the entire to-be-detected optical fiber, see formula (1):

$$R_3(i) = \begin{cases} R_1(i) & \left(i < \frac{s}{2m}\right) \\ R_2\left(\left\lceil \frac{s-im}{m} \right\rceil\right) & \left(i \geq \frac{s}{2m}\right) \end{cases} ; \quad (1)$$

where $\lceil\ \rceil$ represents upward rounding.

step 716: as shown in FIG. 4b, calculating a more intuitive detection result R4 (i), see formula (2):

$$R_4(i) = \begin{cases} R_3(i) & \left(i < \dfrac{s}{2m}\right) \\ R_3(i) - 2\eta\left(i - \dfrac{s}{2m}\right) & \left(i \geq \dfrac{s}{2m}\right) \end{cases} \quad (2)$$

where η is an adjacent optical power attenuation value of the first optical signal or the second optical signal between the adjacent sampling points; referring to FIG. 1, in a case where the optical power relative values corresponding to the sampling points numbered 100 and 125 are 11 dB and 16 dB, respectively, the adjacent optical power attenuation value may be (16-11)/(125-100)=⅕; it is not difficult to see from FIG. 4b that the sampling points numbered 25, 50, 75, 100, 150, 175, 200, and 225 have protrusions; therefore, it can be seen that events occur at the sampling points numbered 25, 50, 75, 100, 150, 175, 200, and 225.

step 718: sending the detection result R4(i) to the target node.

It should be understood that although various steps in the flowcharts of the above embodiments are sequentially displayed according to the indication of arrows, these steps are not necessarily executed sequentially in the order indicated by the arrows. Unless explicitly stated herein, the execution of these steps is not strictly limited to the order, which may be performed in other orders. Moreover, at least some of the steps in the figures may include multiple sub-steps or multiple stages, and these sub-steps or stages are not necessarily executed at the same time, but can be executed at different times; and the order of execution thereof is also not necessarily performed in sequence, but may be executed in turn or alternately with at least a part of other steps or sub-steps or stages of other steps.

The above description of the various embodiments tend to emphasize the differences between the various embodiments. The same or similar contents of the above description of the various embodiments may be referenced to each other, and for the sake of brevity, details are not described herein again.

Figure 5:
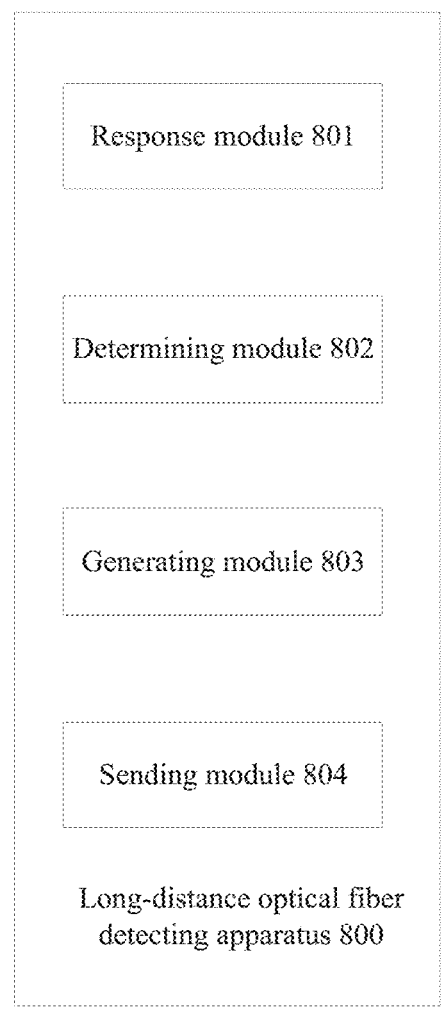
FIG. 5 is a schematic diagram of the structural composition of a long-distance optical fiber detecting apparatus according to an embodiment of the present disclosure.

FIG. 5 is a schematic diagram of the structural composition of a long-distance optical fiber detecting apparatus according to an embodiment of the present disclosure. As shown in FIG. 5, the apparatus 800 comprises a response module 801, a determining module 802, a generating module 803, and a sending module 804.

The response module 801 is configured to, in response to a detection request of a target node on a to-be-detected optical fiber, determine a first sampling sequence and a second sampling sequence respectively formed by propagation, on the to-be-detected optical fiber, of a first optical signal and a second optical signal respectively sent from each end of the to-be-detected optical fiber through an OTDR;

The determining module 802 is configured to determine a total length of the to-be-detected optical fiber;

The generating module 803 is configured to generate a detection result according to the first sampling sequence, the second sampling sequence and the total length;

The sending module 804 is configured to send the detection result to the target node.

In some embodiments, the determining module 801 comprises: a first determining unit which is configured to determine a sending time of a third optical signal recorded by a sending node, the third optical signal being used for measuring the to-be-detected optical; a second determining unit which is configured to determine a receiving time of the third optical signal recorded by a receiving node; a third determining unit which is configured to determine a propagation duration of the third optical signal on the to-be-detected optical fiber according to the sending time and the receiving time; and a fourth determining unit which is configured to determine a total length of the to-be-detected optical fiber according to the propagation duration.

In some embodiments, the first determining unit is configured to send, by a local end node used as the sending node, the third optical signal to an opposite end node used as the receiving node, and record a time stamp of sending the third optical signal as the sending time; correspondingly, the second determining unit is configured to receive, by the local end node, the receiving time sent by the opposite end node used as the receiving node.

In some embodiments, the first determining unit is configured to receive, by a local end node, the sending time sent by an opposite end node; correspondingly, the second determining unit is configured to receive, by the local end node used as the receiving node, the third optical signal, and record a time stamp of receiving the third optical signal as the receiving time.

In some embodiments, the first sampling sequence is a sequence composed of corresponding optical power attenuation values of the first optical signal recorded at each sampling point of the to-be-detected optical fiber; and the second sampling sequence is a sequence composed of corresponding optical power attenuation values of the second optical signal recorded at each sampling point of the to-be-detected optical fiber.

In some embodiments, the first sampling sequence is obtained by sampling the first optical signal sent by the sending node, and the second sampling sequence is obtained by sampling the second optical signal sent by the receiving node, wherein the first and second sampling sequences are numbered from the sending node to the receiving node in an increasing sequence;

correspondingly, the generating module 803 comprises: a fifth determining unit which is configured to determine a ratio between ½ of the total length and the distance between two adjacent sampling points; a first comparison unit, which is configured to add a sampling point in the first sampling sequence to a first sampling subsequence of the first sampling sequence in a case where the serial number of the sampling point in the first sampling sequence is less than the ratio; a first analysis unit, which is configured to analyze the first sampling subsequence, so as to obtain a first detection sub-result; a second comparison unit, which is configured to add a sampling point in the second sampling sequence to a second sampling subsequence of the second sampling sequence in a case where the serial number of the sampling point in the second sampling sequence is larger than or equal to the ratio; a second analysis unit, which is configured to analyze the second sampling subsequence, so as to obtain a second detection sub-result; and a generating unit, which is configured to generate a detection result according to the first detection sub-result and the second detection sub-result.

In some embodiments, the generating unit comprises: a first determining subunit, which is configured to determine an adjacent optical power attenuation value of the first optical signal or the second optical signal between the adjacent sampling points; a second determining subunit, which is configured to determine a third detection sub-result according to the second detection sub-result and the adjacent optical power attenuation value; and a generating subunit, which is configured to generate a detection result according to the first detection sub-result and the third detection sub-result.

In some embodiments, the apparatus 800 further comprises: a regenerating module, which is configured to determine a third sampling sequence and a fourth sampling sequence respectively formed by propagation, on the to-be-detected optical fiber, a fourth optical signal and a fifth optical signal sent from each end of the to-be-detected optical fiber through an OTDR in a case where the detection result does not meet a preset condition; regenerate an update detection result according to the third sampling sequence, the fourth sampling sequence and the total length; and send the update detection result to the target node.

The description of the above apparatus embodiments is similar to the description of the above-mentioned method embodiments, and have similar beneficial effects to the method embodiments. For technical details that are not disclosed in the apparatus embodiments of the present disclosure, please refer to the description of the method embodiments of the present disclosure.

An embodiment of the present disclosure further provides a computer program product. The computer program product comprises a non-transitory computer readable storage medium storing a computer program, and the computer program causes a computer to execute a part or all of the steps of any of the long-distance optical fiber detecting methods described in the above-mentioned method embodiments.

It should be noted that, in the embodiments of the present disclosure, in a case where the afore-mentioned long-distance optical fiber detecting methods are implemented in the form of a software function module, and sold or used as an independent product, it may also be stored in a computer-readable storage medium. Based on such an understanding, the technical solution of the embodiments of the present disclosure substantially, or the portion that has contributed to the related technologies may be embodied in the form of software products, and the computer software product is stored in a storage medium, including several instructions to enable a computer device (which may be a mobile phone, a tablet, a desktop, a personal digital assistant, a navigator, a digital phone, a video phone, a television, a sensing device, etc.) to execute all or a portion of the methods described in various embodiments of the present disclosure. The afore-mentioned storage medium includes various media that can store program codes, such as a USB flash disk, a mobile hard disk, a read-only memory (ROM), a magnetic disk, or an optical disk, and the like.

An embodiment of the present disclosure provides a long-distance optical fiber detecting device, including: an optical time-domain reflectometer OTDR module and a long-distance optical fiber detecting apparatus, wherein:

the OTDR module is configured to, in response to a detection request of a target node on a to-be-detected optical fiber, send a first optical signal, and obtain a first sampling sequence formed by propagating the first optical signal on the to-be-detected optical fiber; or, send a second optical signal, and obtain a second sampling sequence formed by propagating the second optical signal on the to-be-detected optical fiber;

the long-distance optical fiber detecting apparatus is configured to, in response to a detection request of a target node on a to-be-detected optical fiber, trigger the OTDR modules to send a first optical signal or a second optical signal, and respectively obtain a first sampling sequence and a second sampling sequence respectively formed by propagating the first and second optical signals on the to-be-detected optical fiber; determine a total length of the to-be-detected optical fiber; generate a detection result according to the first sampling sequence, the second sampling sequence and the total length; and send the detection result to the target node.

Figure 6:
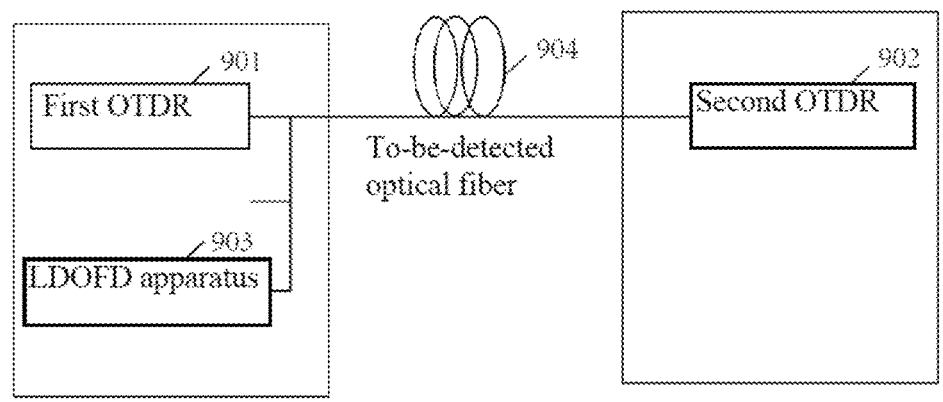
FIG. 6 is a schematic diagram of the structural composition of a long-distance optical fiber detecting device according to an embodiment of the present disclosure.

An embodiment of the present disclosure provides a long-distance optical fiber detecting system. Referring to FIG. 6, the long-distance optical fiber detecting system comprises: a first OTDR module 901, a second OTDR module 902, and a long-distance optical fiber detecting (LDOFD) apparatus 903, wherein:

the first OTDR module 901 is configured to send a first optical signal in response to a detection request of a target node on a to-be-detected optical fiber 904, and obtain a first sampling sequence formed by propagation of the first optical signal on the to-be-detected optical fiber 904;

the second OTDR module 902 is configured to send a second optical signal in response to the detection request of the target node on the to-be-detected optical fiber 904, and obtain a second sampling sequence formed by propagation of the second optical signal on the to-be-detected optical fiber 904;

the long-distance optical fiber detecting apparatus 903 is configured to, in response to the detection request of the target node on the to-be-detected optical fiber 904, respectively trigger the first OTDR module 901 to send the first optical signal and the second OTDR module 902 to send the second optical signal, and respectively obtain the first sampling sequence and the second sampling sequence respectively formed by propagation of the first and second optical signals on the to-be-detected optical fiber 904; determine a total length of the to-be-detected optical fiber 904; generate a detection result according to the first sampling sequence, the second sampling sequence and the total length; and send the detection result to the target node.

Correspondingly, an embodiment of the present disclosure provides a computer readable storage medium having a computer program stored thereon, and the computer program, when executed by a processor, implements the steps of the long-distance optical fiber detecting methods provided in the above-mentioned embodiments.

It should be pointed out here that the above description concerning the storage medium, the system and the device embodiments is similar to those of the foregoing method embodiments, and the storage medium, the system and the device embodiments have the beneficial effects similar to those of the method embodiments. For technical details that are not disclosed in the storage medium, the system and the device embodiments of the present disclosure, please refer to the description of the method embodiments of the present disclosure for understanding.

It should be understood that "one embodiment" or "an embodiment" mentioned throughout the description means that a particular feature, structure, or characteristic related to the present disclosure is included in at least one embodiment of the present disclosure. Therefore, "in one embodiment" or "in an embodiment" in various places throughout the description does not necessarily refer to the same embodiment. Furthermore, these particular features, structures, or characteristics may be combined in any suitable manner in one or more embodiments. It should be understood that, in various embodiments of the present disclosure, the magnitude of the serial numbers of the above-mentioned processes does not mean the sequence of execution, and the execution sequence of each process should be determined by the function and the internal logic thereof, and should not constitute any limitation on the realization process of the embodiments of the present disclosure. The above-mentioned serial numbers of the embodiments of the present disclosure are only for description, and do not represent the advantages or disadvantages of the embodiments.

It should be noted that, herein, the terms "comprise", "include", "concern" or any other variation thereof are intended to encompass a non-exclusive inclusion, such that a process, a method, an article, or a device comprising a series of elements not only includes those elements, but also includes other elements not expressly listed, or further includes an element inherent to such a process, method, article, or apparatus. Without further limitation, an element defined by a sentence "including one . . . ", "comprising one", "including a" or "comprising a" does not exclude the existence of other identical elements in a process, a method, an article or a device that includes the element.

In the several embodiments provided in the present disclosure, it should be understood that the disclosed methods and devices may be realized in other ways. The device embodiments described above are merely schematic, for example, the division of the units is merely a logical function division, and there may be another division way in actual realization, e.g. multiple units or components may be combined, or may be integrated into another system, or some features may be ignored or not executed. In addition, the coupling, or direct coupling, or communication connection between the various components shown or discussed may be through some interfaces, and the indirect coupling or communication connection of devices or units may be electrical, mechanical or other forms.

The unit described above as a separate component may or may not be physically separated, and the component displayed as a unit may or may not be a physical unit; it may be located in one place or distributed to multiple network units; and some or all of the units may be selected according to actual needs to realize the purpose of the solutions of the present embodiments. In addition, each functional unit in each embodiment of the present disclosure may be integrated into one processing module, or each unit may be separately used as a unit, or two or more units may be integrated into one unit; the above-mentioned integrated unit may be realized in a form of hardware, or may be realized in a form of hardware plus software functional units.

Those ordinary skilled in the art may understand that all or a portion of the steps for implementing the above-mentioned method embodiments may be completed by means of hardware related to program instructions, and the afore-mentioned program may be stored in a computer-readable storage medium, and when the program is executed, the steps of the above-mentioned method embodiments are executed; and the afore-mentioned storage medium includes various media that may store program codes, such as a removable storage device, a read-only memory (ROM), a magnetic disk, or an optical disk, and the like. Alternatively, in a case where the above-mentioned integrated units are realized in the form of software function modules and are sold or used as independent products, they may be stored in a computer-readable storage medium. Based on such an understanding, the technical solution of the embodiments of the present disclosure, or the portions that have made contributions to the related technologies, may essentially be embodied in the form of software products, and the computer software product is stored in a storage medium, including several instructions to enable a computer device (which may be a mobile phone, a tablet computer, a desktop computer, a personal digital assistant, a navigator, a digital phone, a video phone, a television, a sensor device, etc.) to execute all or a portion of the method described in the various embodiments of the present disclosure. The afore-mentioned storage medium includes various media that can store program codes, such as a removable storage device, a ROM, a magnetic disk, or an optical disk, and the like.

The methods disclosed in the several method embodiments provided by the present disclosure can be arbitrarily combined without conflict to obtain new method embodiments. The features disclosed in the several product embodiments provided by the present disclosure may be arbitrarily combined without conflict to obtain a new product embodiment. The features disclosed in several method embodiments or device embodiments provided by the present disclosure may be combined arbitrarily without conflict to obtain a new method embodiment or device embodiment.

The above description refers to only the embodiments of the present disclosure, however, the protection scope of the present disclosure is not limited to it. Any person skilled in the art can easily think of changes or substitutions within the technical scope as disclosed by the present disclosure, which should be included within the protection scope of the present disclosure. Therefore, the protection scope of the present disclosure should be subject to the protection scope of the present disclosure.

INDUSTRIAL PRACTICABILITY

In the present embodiments, by means of determining a first sampling sequence and a second sampling sequence that are formed by respectively propagating, on a to-be-detected optical fiber, a first optical signal and a second optical signal respectively sent from each end of the to-be-detected optical fiber through an OTDR, and combining with a total length of the to-be-detected optical fiber, a detection result of the to-be-detected optical fiber is generated. As a result, in a case where the optical fiber is long, full coverage detection of the entire to-be-detected optical fiber can be realized, thereby improving the reliability of optical fiber detection.

What is claimed is:
1. A long-distance optical fiber detecting method, comprising:
in response to a detection request of a target node on a to-be-detected optical fiber, determining a first sampling sequence and a second sampling sequence that are formed by respectively propagating, on the to-be-detected optical fiber, a first optical signal and a second optical signal respectively sent from each end of the to-be-detected optical fiber by an OTDR;
determining a total length of the to-be-detected optical fiber;
generating a detection result according to the first sampling sequence, the second sampling sequence, and the total length; and
sending the detection result to the target node,
wherein the determining the total length of the to-be-detected optical fiber comprises:
determining a sending time of a third optical signal recorded by a sending node; the third optical signal being used for measuring the to-be-detected optical fiber;

determining a receiving time of the third optical signal recorded by a receiving node;
determining a propagation duration of the third optical signal on the to-be-detected optical fiber according to the sending time and the receiving time; and
determining the total length of the to-be-detected optical fiber according to the propagation duration.

2. The method of claim 1, wherein the determining a sending time of a third optical signal recorded by a sending node comprises: sending, by a local end node used as the sending node, the third optical signal to an opposite end node, and recording a time stamp of sending the third optical signal as the sending time; correspondingly, the determining a receiving time of the third optical signal recorded by a receiving node comprises: receiving, by the local end node, the receiving time sent by the opposite end node used as the receiving node;
or,
the determining a sending time of a third optical signal recorded by a sending node comprises: receiving, by a local end node, the sending time sent by an opposite end node; correspondingly, the determining a receiving time of the third optical signal recorded by a receiving node comprises: receiving, by the local end node used as the receiving node, the third optical signal, and recording a time stamp of receiving the third optical signal as the receiving time.

3. The method of claim 1, wherein after generating the detection result according to the first sampling sequence, the second sampling sequence and the total length, the method further comprises:
in a case where the detection result does not meet a preset condition, determining a third sampling sequence and a fourth sampling sequence that are formed by respectively propagating, on the to-be-detected optical fiber, a fourth optical signal and a fifth optical signal sent from each end of the to-be-detected optical fiber by a third ODTR and a fourth OTDR respectively disposed at each end of the to-be-detected optical fiber, wherein a sum of dynamic ranges of the third optical time-domain reflectometer and the fourth optical time-domain reflectometer is larger than a sum of dynamic ranges of the OTDRs sending the first and second optical signals;
regenerating an update detection result according to the third sampling sequence, the fourth sampling sequence and the total length;
sending the update detection result to the target node.

4. The method according to claim 1, wherein
the first sampling sequence is a sequence composed of corresponding optical power relative values recorded by the first optical signal at each sampling point of the to-be-detected optical fiber;
the second sampling sequence is a sequence composed of corresponding optical power relative values recorded by the second optical signal at each sampling point of the to-be-detected optical fiber.

5. The method of claim 4, wherein the first sampling sequence is obtained by sampling the first optical signal sent by a sending node, and the second sampling sequence is obtained by sampling the second optical signal sent by a receiving node, and sampling points in the first sampling sequence and the second sampling sequence are numbered from the sending node to the receiving node in an increasing sequence, respectively;

correspondingly, the generating a detection result according to the first sampling sequence, the second sampling sequence and the total length comprises:
determining a ratio between ½ of the total length and a distance between two adjacent sampling points;
in a case where a serial number of a sampling point in the first sampling sequence is less than the ratio, adding the sampling point to a first sampling subsequence of the first sampling sequence;
analyzing the first sampling subsequence, so as to obtain a first detection sub-result;
in a case where a serial number of a sampling point in the second sampling sequence is larger than or equal to the ratio, adding the sampling point to a second sampling subsequence of the second sampling sequence;
analyzing the second sampling subsequence, so as to obtain a second detection sub-result;
generating a detection result according to the first detection sub-result and the second detection sub-result.

6. The method of claim 5, wherein the generating a detection result according to the first detection sub-result and the second detection sub-result comprises:
determining an adjacent optical power attenuation value of the first optical signal or the second optical signal between the two adjacent sampling points;
determining a third detection sub-result according to the second detection sub-result and the adjacent optical power attenuation value;
generating the detection result according to the first detection sub-result and the third detection sub-result.

7. A long-distance optical fiber detecting device, comprising: two optical time-domain reflectometer OTDR modules disposed at each end of a to-be-detected optical fiber, and a long-distance optical fiber detecting apparatus, wherein:
in response to a detection request of a target node on the to-be-detected optical fiber, one of the two OTDR modules sends a first optical signal and obtains a first sampling sequence formed by propagating the first optical signal on the to-be-detected optical fiber, or, an other of the two OTDR modules sends a second optical signal and obtains a second sampling sequence formed by propagating on the to-be-detected optical fiber;
the long-distance optical fiber detecting apparatus includes a response module, a determining module, a generating module, and a sending module, wherein the response module responds to the detection request of the target node on the to-be-detected optical fiber, determines the first sampling sequence and the second sampling sequence formed by respectively propagating the first and second optical signals on the to-be-detected optical fiber; the determining module determines a total length of the to-be-detected optical fiber; the generating module generates a detection result according to the first sampling sequence, the second sampling sequence and the total length; and the sending module sends the detection result to the target node,
wherein the determining the total length of the to-be-detected optical fiber comprises:
determining a sending time of a third optical signal recorded by a sending node; the third optical signal being used for measuring the to-be-detected optical fiber;
determining a receiving time of the third optical signal recorded by a receiving node;
determining a propagation duration of the third optical signal on the to-be-detected optical fiber according to the sending time and the receiving time; and determining the total length of the to-be-detected optical fiber according to the propagation duration.

8. A non-transitory computer readable medium comprising a computer program stored thereon that, when executed by a processor, causes a method to be performed, the method comprising:
in response to a detection request of a target node on a to-be-detected optical fiber, determining a first sampling sequence and a second sampling sequence that are formed by respectively propagating, on the to-be-detected optical fiber, a first optical signal and a second optical signal respectively sent from each end of the to-be-detected optical fiber by an OTDR;
determining a total length of the to-be-detected optical fiber;
generating a detection result according to the first sampling sequence, the second sampling sequence, and the total length; and
sending the detection result to the target node,
wherein the determining the total length of the to-be-detected optical fiber comprises:
determining a sending time of a third optical signal recorded by a sending node; the third optical signal being used for measuring the to-be-detected optical fiber;
determining a receiving time of the third optical signal recorded by a receiving node;
determining a propagation duration of the third optical signal on the to-be-detected optical fiber according to the sending time and the receiving time; and
determining the total length of the to-be-detected optical fiber according to the propagation duration.

9. The non-transitory computer readable medium according to claim 8, wherein the determining a sending time of a third optical signal recorded by a sending node comprises: sending, by a local end node used as the sending node, the third optical signal to an opposite end node, and recording a time stamp of sending the third optical signal as the sending time; correspondingly, the determining a receiving time of the third optical signal recorded by a receiving node comprises: receiving, by the local end node, the receiving time sent by the opposite end node used as the receiving node;
or,
the determining a sending time of a third optical signal recorded by a sending node comprises: receiving, by a local end node, the sending time sent by an opposite end node; correspondingly, the determining a receiving time of the third optical signal recorded by a receiving node comprises: receiving, by the local end node used as the receiving node, the third optical signal, and recording a time stamp of receiving the third optical signal as the receiving time.

10. The non-transitory computer readable medium according to claim 8, wherein after generating the detection result according to the first sampling sequence, the second sampling sequence and the total length, the method further comprises:
in a case where the detection result does not meet a preset condition, determining a third sampling sequence and a fourth sampling sequence that are formed by respectively propagating, on the to-be-detected optical fiber, a fourth optical signal and a fifth optical signal sent from each end of the to-be-detected optical fiber by a third ODTR and a fourth OTDR respectively disposed at each end of the to-be-detected optical fiber, wherein a sum of dynamic ranges of the third optical time-domain reflectometer and the fourth optical time-domain reflectometer is larger than a sum of dynamic ranges of the OTDRs sending the first and second optical signals;
regenerating an update detection result according to the third sampling sequence, the fourth sampling sequence and the total length;
sending the update detection result to the target node.

11. The non-transitory computer readable medium according to claim 8, wherein
the first sampling sequence is a sequence composed of corresponding optical power relative values recorded by the first optical signal at each sampling point of the to-be-detected optical fiber;
the second sampling sequence is a sequence composed of corresponding optical power relative values recorded by the second optical signal at each sampling point of the to-be-detected optical fiber.

12. The non-transitory computer readable medium according to claim 11, wherein the first sampling sequence is obtained by sampling the first optical signal sent by a sending node, and the second sampling sequence is obtained by sampling the second optical signal sent by a receiving node, and sampling points in the first sampling sequence and the second sampling sequence are numbered from the sending node to the receiving node in an increasing sequence, respectively;
correspondingly, the generating a detection result according to the first sampling sequence, the second sampling sequence and the total length comprises:
determining a ratio between ½ of the total length and a distance between two adjacent sampling points;
in a case where a serial number of a sampling point in the first sampling sequence is less than the ratio, adding the sampling point to a first sampling subsequence of the first sampling sequence;
analyzing the first sampling subsequence, so as to obtain a first detection sub-result;
in a case where a serial number of a sampling point in the second sampling sequence is larger than or equal to the ratio, adding the sampling point to a second sampling subsequence of the second sampling sequence;
analyzing the second sampling subsequence, so as to obtain a second detection sub-result;
generating a detection result according to the first detection sub-result and the second detection sub-result.

13. The non-transitory computer readable medium according to claim 12, wherein the generating a detection result according to the first detection sub-result and the second detection sub-result comprises:
determining an adjacent optical power attenuation value of the first optical signal or the second optical signal between the two adjacent sampling points;
determining a third detection sub-result according to the second detection sub-result and the adjacent optical power attenuation value;
generating the detection result according to the first detection sub-result and the third detection sub-result.

* * * * *